(12) United States Patent
Dotsenko

(10) Patent No.: US 7,227,977 B1
(45) Date of Patent: Jun. 5, 2007

(54) LIGHTING CORRECTION FOR THE OUTDOOR ENVIRONMENT WITH EXTENSION TO THE SELF ADJUSTING ALGORITHM FOR GENERAL LIGHTING CONDITIONS

(75) Inventor: Elena V. Dotsenko, San Gabriel, CA (US)

(73) Assignee: L-I Identity Solutions, Inc., Stamford, CT (US)

( * ) Notice: Subject to any disclaimer, the term of this patent is extended or adjusted under 35 U.S.C. 154(b) by 697 days.

(21) Appl. No.: 10/340,111

(22) Filed: Jan. 10, 2003

(51) Int. Cl.
*G06K 9/00* (2006.01)

(52) U.S. Cl. ............... 382/118; 345/426; 356/601; 382/154; 382/203

(58) Field of Classification Search .......... 356/328, 356/3.08, 601, 610; 382/115, 118, 154, 203, 382/276; 345/419, 426, 473; 703/2
See application file for complete search history.

(56) References Cited

U.S. PATENT DOCUMENTS

| | | | | |
|---|---|---|---|---|
| 5,838,428 A | * | 11/1998 | Pipitone et al. | 356/3.09 |
| 5,867,265 A | * | 2/1999 | Thomas | 356/328 |
| 6,269,197 B1 | * | 7/2001 | Wallack | 382/285 |
| 6,697,518 B2 | * | 2/2004 | Belhumeur et al. | 382/154 |
| 6,718,049 B2 | * | 4/2004 | Pavlidis et al. | 382/115 |
| 6,850,872 B1 | * | 2/2005 | Marschner et al. | 703/2 |
| 2006/0182367 A1 | * | 8/2006 | Moghaddam | 382/276 |

* cited by examiner

*Primary Examiner*—Gregory Desire
(74) *Attorney, Agent, or Firm*—Lahive & Cockfield, LLP; Anthony A. Laurentano, Esq.; David R. Burns, Esq.

(57) ABSTRACT

Systems and methods for identifying an object, such as a human face, are described. The systems and methods obtain parameters indicative of direct light and disperse light illuminating the object. Using these parameters, an albedo of the object is computed. The albedo is related to the radiance of the object after light is shone on the object, and is used to identify the object.

57 Claims, 17 Drawing Sheets

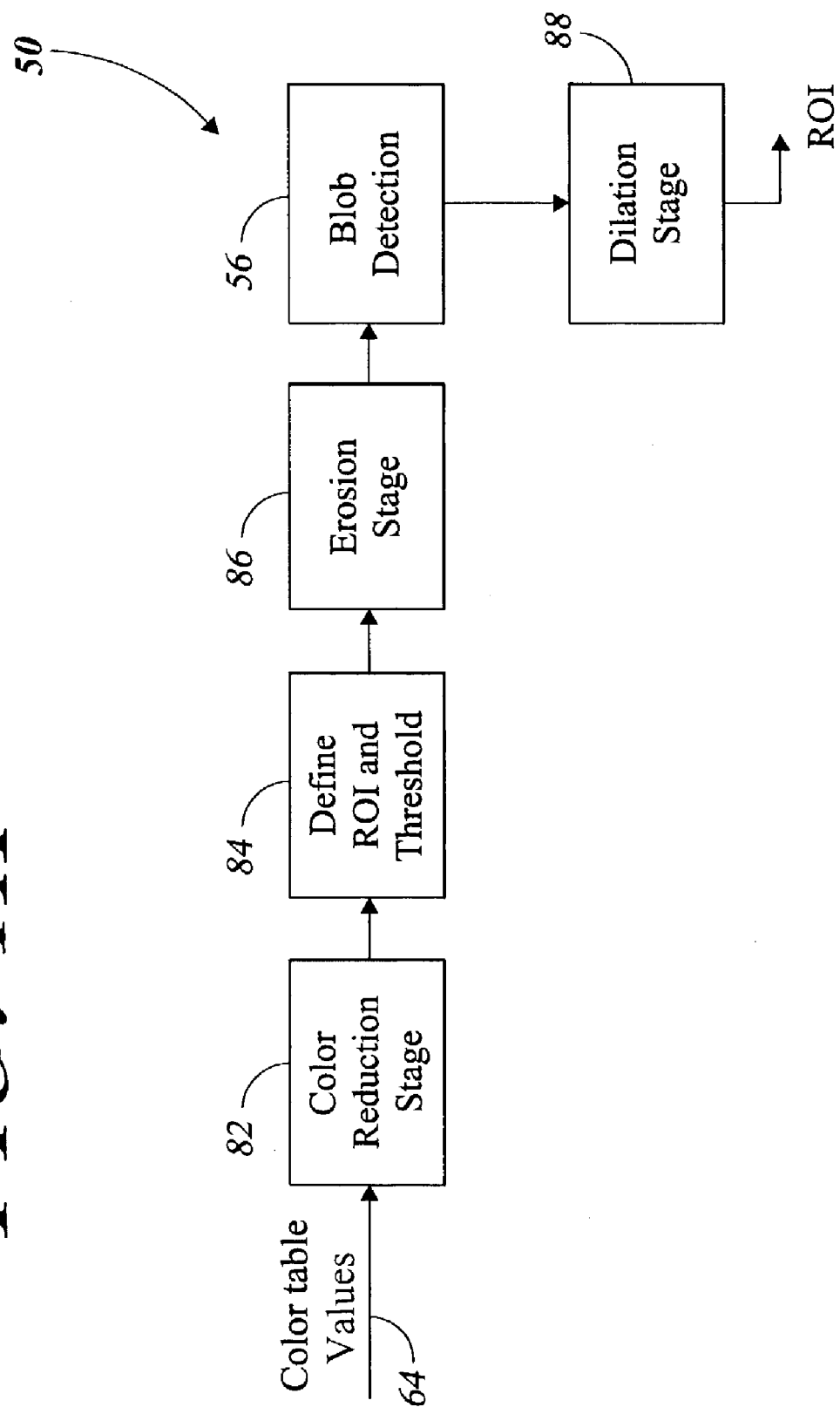

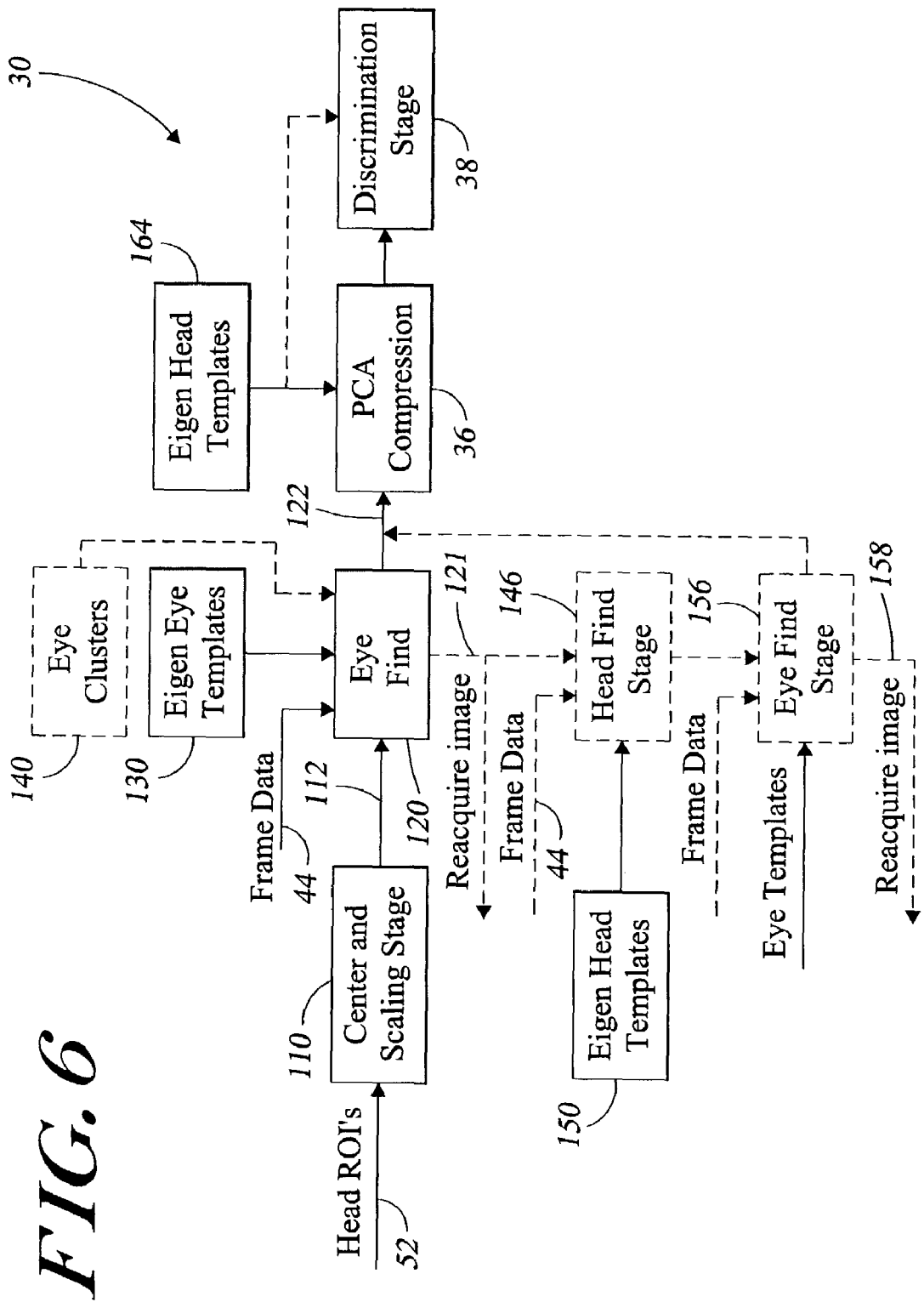

LIGHTING CORRECTION FOR THE OUTDOOR ENVIRONMENT WITH EXTENSION TO THE SELF ADJUSTING ALGORITHM FOR GENERAL LIGHTING CONDITIONS

TECHNICAL FIELD

The present invention relates generally to object recognition, and specifically relates to object recognition using the albedo of the object.

BACKGROUND OF THE INVENTION

Modern identification and verification systems typically provide components that capture an image of a person, and then convert the image to some mathematical representation, such as a vector whose components are the intensities of the pixels in the image. The vector, with associated circuitry and hardware, may then be compared with reference vectors of known individuals. A match between the vector and a reference vector can yield the identity of the person.

Such techniques, while straightforward, place an enormous processing burden on the system because the number of pixels in a typical image may be on the order of tens of thousands. Comparing an unknown vector to thousands of reference vectors takes too long. Prior art systems have addressed this problem by using Principal Component Analysis (PCA) on image data to reduce the amount of data that needs to be stored to operate the system efficiently. An example of such a system is set forth in U.S. Pat. No. 5,164,992, the contents of which are hereby incorporated by reference. However, although PCA can decrease the time required for identification to allow for real-time operation, the method can sometimes yield inaccurate results. Such inaccuracies can arise for a variety of reasons, one of which involves problems that arise by not accounting for different types of light that can illuminate an object.

SUMMARY OF THE INVENTION

The albedo of an object is a measure of the amount of light reflected by an object, or radiance, relative to the amount of incident light shone on the object, or irradiance, and is indicative of the reflectance or intrinsic brightness of an object. The albedo of an object can be likened to a signature of a person, and can be used to identify the object according to the principles of the present invention. The identification process is more accurate when the illumination of the object is decomposed into disperse (or diffuse or Lambertian) lighting and direct (or specular) lighting. The present invention accounts for these types of illumination.

In particular, a method for identifying an object is described herein. The method includes acquiring an image of an object exposed to direct light and to disperse light, and calculating a first parameter indicative of the direct light and a second parameter indicative of the disperse light. The method also includes obtaining an albedo by using the first parameter, and the second parameter, and utilizing the albedo to identify the object.

Also described herein is a system for identifying an object. The system includes an image acquisition device for acquiring an image of an object exposed to direct light and to disperse light, and a merit function manipulator for calculating a first parameter indicative of the direct light and a second parameter indicative of the disperse light. The system further includes an albedo developer for obtaining an albedo associated with the image by using the first parameter, and the second parameter, and a discrimination stage for utilizing the albedo, or a representation thereof, to identify the object.

In another embodiment of the present invention, a system capable of acquiring an image of an individual is provided for identifying the individual from an acquired image of the individual. The system is capable of acquiring an image of the individual with an image acquisition device and from the image determining a first parameter and a second parameter. The system generates a first representation of the individual in the acquired image and generates a second representation of the individual in the acquired image using the first parameter, the second parameter and the first representation. The system is able to identify the individual in the acquired image using the second representation of the individual.

In yet another embodiment of the present invention, a device readable medium holding device executable instructions for performing a method to identify an individual using an amount of light reflected by the individual is provided. The device readable medium allows an image capturing device to capture an image of the individual. From the captured image a first representation of the individual is generated using the amount of light reflected by the individual in the captured image. From the first representation a second representation of the individual is generated. The second representation of the individual is used to identify the individual.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

FIG. 4A is another detailed schematic block diagram depiction of the detection stage illustrating the erosion and dilation operations performed on the image according to the teachings of the present invention.

FIG. 6 is a more detailed schematic block diagram depiction of the real time facial recognition system of FIG. 1 according to the teachings of the present invention.

DESCRIPTION OF ILLUSTRATED EMBODIMENTS

The present invention relates to an image identification and verification system that can be used in a multitude of environments, including access control facilities, monitory transaction sites and other secured installations. The present invention has wide applicability to a number of different fields and installations, but for purposes of clarity will be discussed below in connection with an access control verification and identification system. The following use of this example is not to be construed in a limiting sense.

Figure 1:
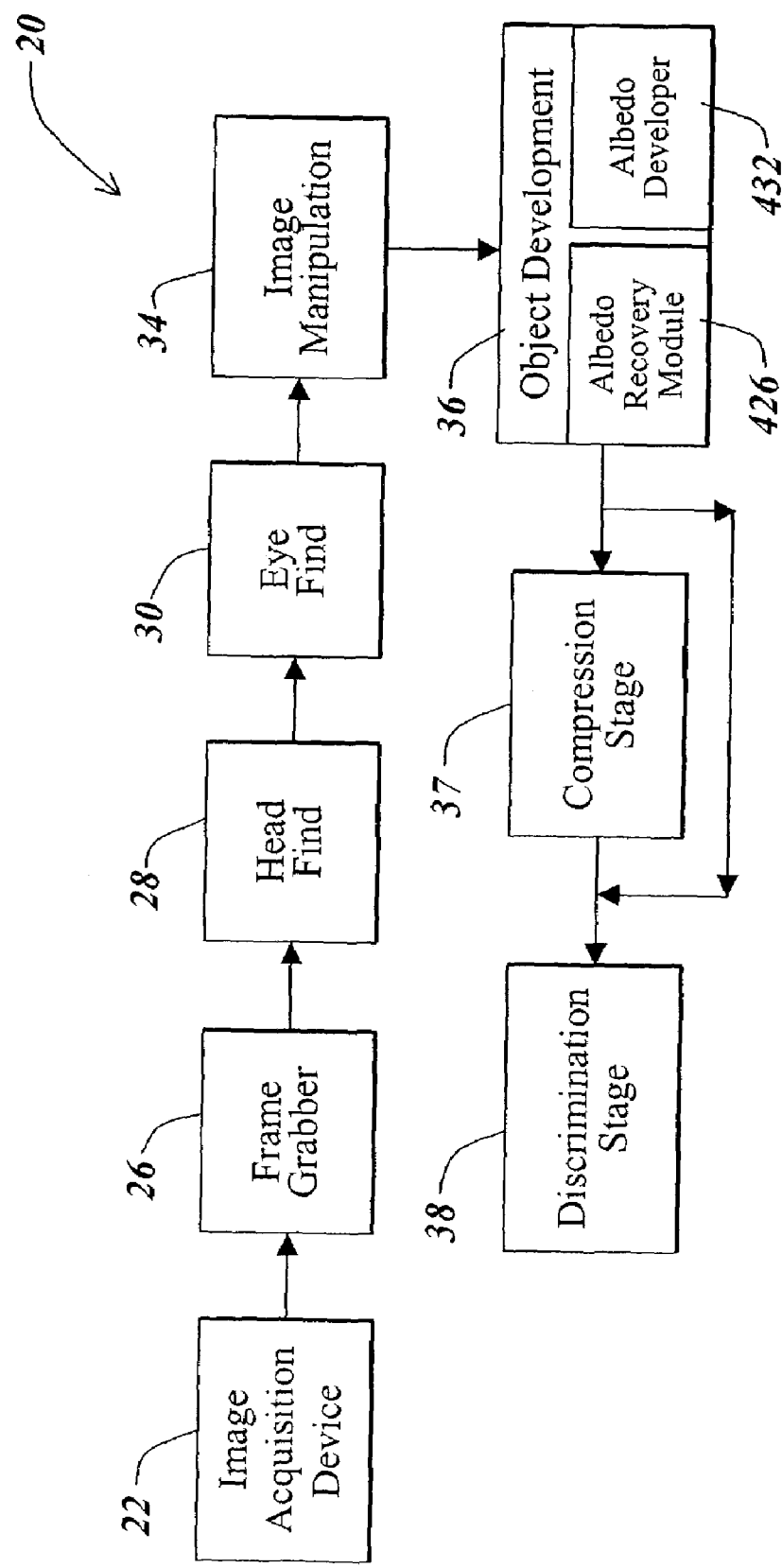
FIG. 1 is a schematic block diagram of a real time facial recognition system according to the teachings of the present invention.

FIG. 1 illustrates a facial identification and verification system 20 according to the teachings of the present invention. The illustrated system 20 includes a multitude of serially connected stages. These stages include an image acquisition stage 22, a frame grabber stage 26, a head find stage 28, an eye find stage 30, an image manipulation stage 34, an object development stage 36, which can include an albedo recovery module 426 and a albedo developer 432, a compression stage 37, and a discrimination stage 38.

The image acquisition device 22, and frame grabber 26 function to acquire an image of an object, such as a person. The head find stage 28 and the eye find stage 30 help identify a head or eyes within the image. Once these features have been identified, surrounding information, like the background, can be cropped out leaving a new image with a head or eyes in the center.

The image manipulation stage 34 places the image in suitable condition for further processing. In one embodiment shown in FIG. 1, the image manipulation stage 34 passes image data to the object development unit 36. The albedo recovery module 426 and the albedo developer 432 in the object development unit 36 help produce an albedo of the object. The albedo may then be passed on either 1) directly to the discrimination stage 38, which attempts to match the albedo to a reference albedo, or 2) to the compression stage 37 for compression into an albedo representation, which representation is then input into the discrimination stage 38 for matching. The compression stage 37 uses principal component analysis to produce eigenvectors of a covariance matrix that span a subspace. A vector representing the image or the albedo is then projected onto this subspace to form a compressed albedo representation used by the discrimination stage 38 to identify the object.

Figure 2:
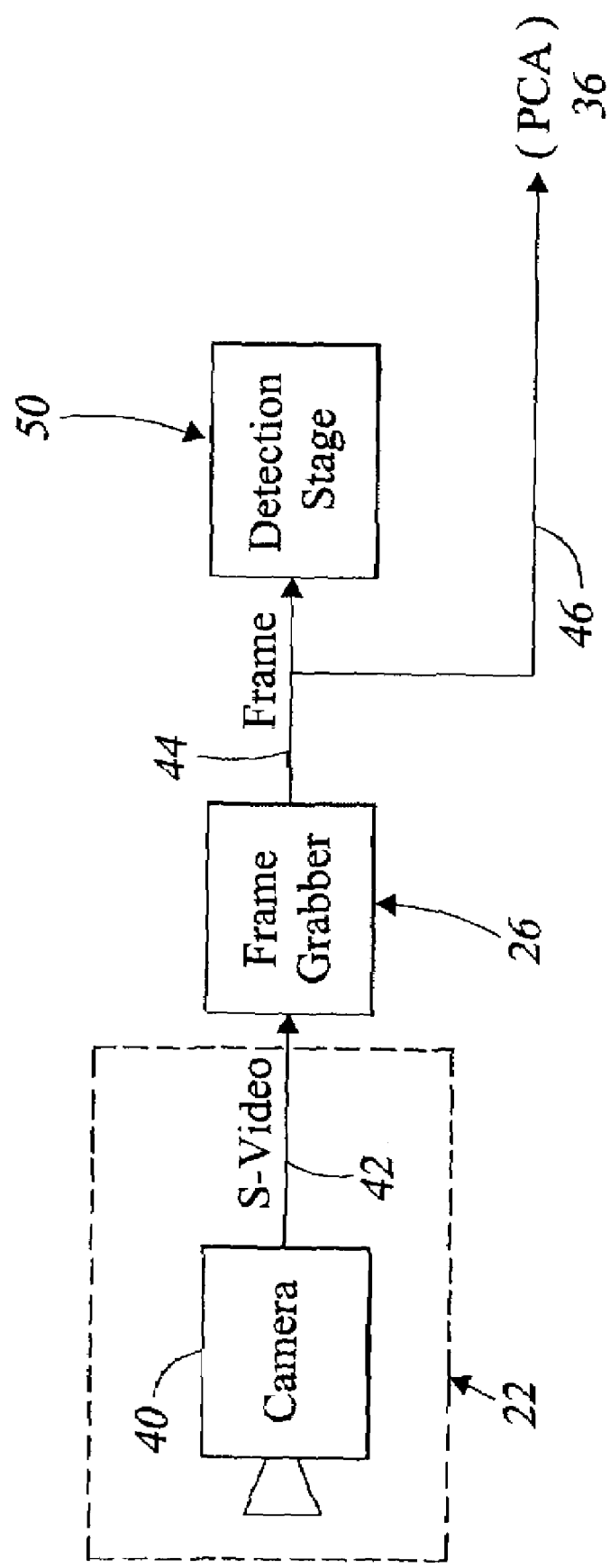
FIG. 2 is a schematic block diagram of the image acquisition and detection portions of the real time facial recognition system of FIG. 1 in accordance with the teachings of the present invention.

FIG. 2 illustrates in further detail the front end portion of the system 20. The image acquisition stage 22 includes a video camera 40, which produces an S-video output stream 42 at conventional frame rates. Those of ordinary skill will appreciate that the video camera used herein may be a monochrome camera, a full color camera, or a camera that is sensitive to non-visible portions of the spectrum. Those skilled in the art will also appreciate that the image acquisition stage 22 may be realized as a variety of different types of video cameras and in general, any suitable mechanism for providing an image of a subject may be used as the image acquisition stage 22. The image acquisition stage 22 may, alternatively, be an interface to a storage device, such as a magnetic storage medium or other components for storing images or image data. As used herein, "image data" refers to data such as luminance values, chrominance values, grey scale and other data associated with, defining or characterizing an image.

The video output stream 42 is received by a frame grabber 26, which serves to latch frames of the S-video input stream and to convert the S-video analog signal into a digitized output signal, which is then processed by the remainder of the system 20. It is known that conventional video cameras produce an analog video output stream of 30 frames per second, and thus the frame grabber 26 is conventionally configured to capture and digitize image frames as this video rate. The video camera need not be limited to S-video, and can include near IR or IR mode, which utilizes RS170 video.

The frame grabber 26 produces a digitized frame output signal 44 which is operatively communicated with multiple locations. As illustrated, the output signal 44 communicates with a broadly termed detection stage 50, which corresponds at least in part to the head find stage 28 of FIG. 1. The output signal 44 also communicates with the compression stage 37, which is described in further detail below. Those of ordinary skill will realize that the camera itself can digitize acquired images, and hence the frame grabber stage 26 can be integrated directly into the camera.

Figure 3:
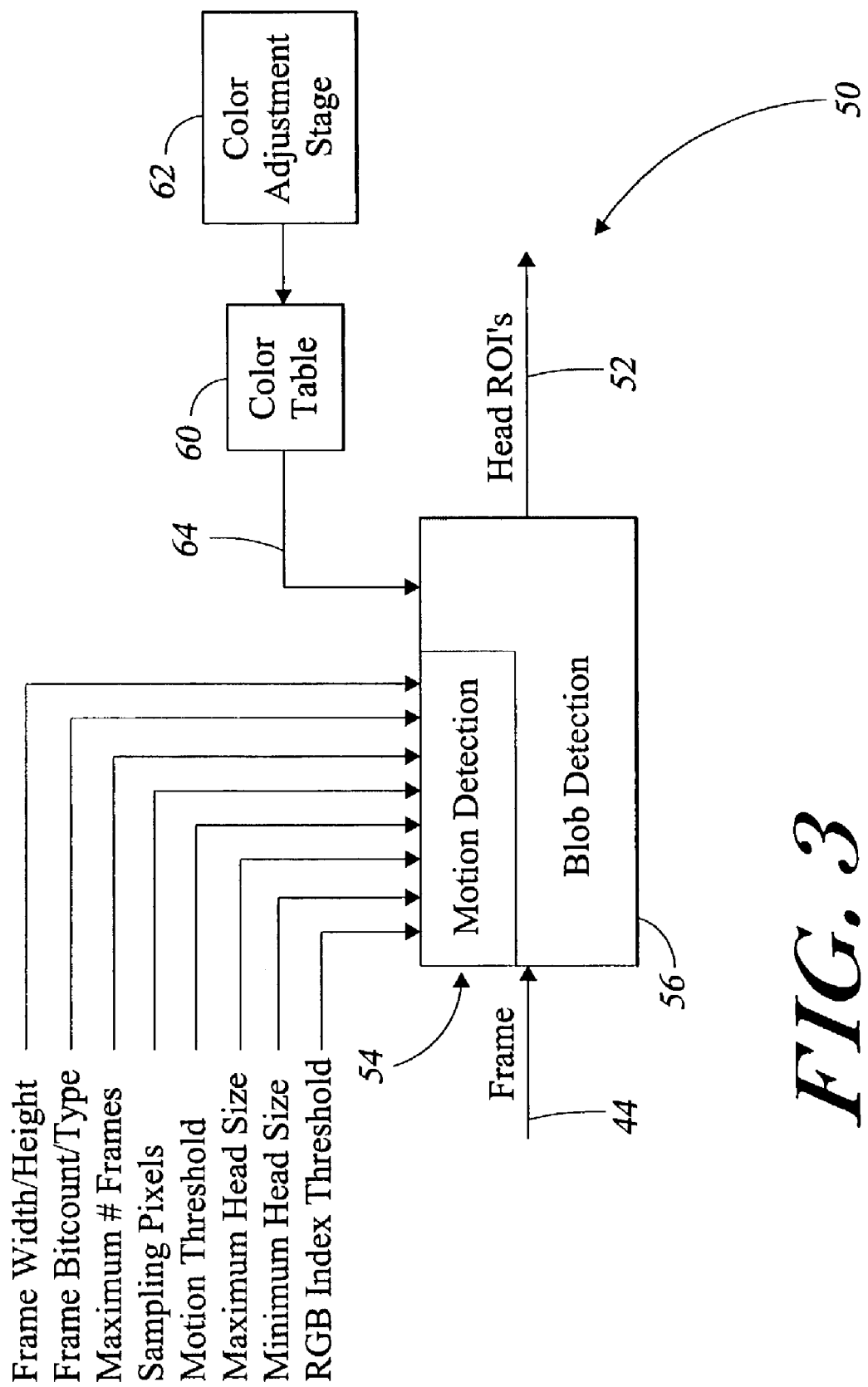
FIG. 3 is more detailed schematic depiction of the detection stage of FIG. 2, which includes a color matching stage in accord with the teachings of the present invention.

FIG. 3 is a further schematic depiction of the detection stage 50 of FIG. 2. The video frame signal 44 is received by the detection stage 50. The signal comprises an N by N array of pixels, such as a 256×256 pixel array, which have selected chrominance and luminance values. The pixels are inputted into the detection stage 50, and preferably are analyzed first by the motion detection stage 54. The motion detection stage 54 receives a number of input signals, as illustrated, such as signals corresponding to frame width and height, frame bit counts and type, maximum number of frames, selected sampling pixel rate, motion threshold values, maximum and minimum head size, and RGB index threshold values. One or more of these additional input signals in combination with the frame input signal 44 trigger the motion detection stage to assess whether motion has occurred within the field of view. In particular, the motion detection stage 54 is adapted to detect subtle changes in pixel values, such as luminance values, which represent motion, especially when an object moves against a relatively still background image (such as a kiosk, cubicle or hallway). One method of determining motion is to perform a differencing function on selected pixels in successive frames, and then comparing changes in pixel values against a threshold value. If the pixel variations within the field of view exceed the threshold value, then an object is deemed to have moved within the image. Conversely, if the changes are below the threshold, the system determines that no suitable motion has occurred.

According to another technique, a spatio-temporal filtering scheme can be applied to the captured image to detect motion, as set forth in U.S. Pat. No. 5,164,992 of Turk et al., the contents of which are hereby incorporated by reference. In this scheme, a sequence of image frames from the camera 40 pass through a spatio-temporal filtering module which accentuates image locations which change with time. The spatio-temporal filtering module identifies within the frame the locations and motion by performing a differencing operation on successive frames of the sequence of image frames. A typical output of a conventional spatio-temporal filter module have the moving object represented by pixel values having significantly higher luminance than areas of non-motion, which can appear as black.

The spatio-temporal filtered image then passes through a thresholding module which produces a binary motion image identifying the locations of the image for which the motion exceeds a threshold. Those of ordinary skill will recognize that the threshold can be adjusted to select a certain degree of motion. Specifically, minor movements within the field of view can be compensated for by requiring heightened degrees of motion within the field of view in order to trigger the system. Hence, the thresholding module can be adjusted to locate the areas of the image containing the most motion. This filtering scheme is particularly advantageous in monitoring transaction environments where an individual seeking access to, for example, an ATM machine, would have to approach the ATM machine, and thus create motion within the field of view.

According to one practice, once the detection stage 50 has detected motion and determines that the motion of the object within the field of view exceeds a selected threshold, the blob detection stage 56 analyzes the binary motion image generated by the motion detection stage 54 to determine whether motion occurs within the field of view, for example, by sensing a change in pixel content over time. From this information, the blob detection stage 56 defines a region of interest (ROI) roughly corresponding to the head position of the person in the field of view. This ROI is truly a rough approximation of the region corresponding to the head and practically is an area larger than the head of the person, although it may also be a region of about the same size. The blob detection stage employs known techniques to define and then correlate an object (e.g., the head of a person) in the image. The present invention realizes that the motion information can be employed to roughly estimate the region of interest within the image that corresponds to the person's head. In particular, the blob detection stage 56 designates a "blob" corresponding roughly to the head or ROI of the person within the field of view. A blob is defined as a contiguous area of pixels having the same uniform property, such as grey scale, luminance, chrominance, and so forth. Hence, the human body can be modeled using a connected set of blobs. Each blob has a spatial and color Gaussian distribution, and can have associated therewith a support map, which indicates which pixels are members of a particular blob. The ability to define blobs through hardware (such as that associated with the blob detection stage 56) is well known in the art, although the blob detection stage 56 can also be implemented in software. The system therefore clusters or blobs together pixels to create adjacent blobs, one of which corresponds to a person's head, and hence is defined as the ROI.

According to another practice and with further reference to FIG. 3, the color table 60 can be employed to further refine the ROI corresponding to the head. The word "refine" is intended to mean the enhancement, increase or improvement in the clarity, definition and stability of the region of interest, as well as a further refinement in the area defined as the region corresponding to the person's head. For example, as discussed above, the ROI established by the motion detection stage is a rough region, larger than the head, that defines a general area within which the head can be found. Flesh tone colors can be employed to "lighten" or reduce the ROI characterizing the person's head to better approximate the area corresponding to the head. This process serves to overall refine the region of interest. The color table is intended to be representative of any suitable data storage medium that is accessible by the system in a known manner, such as RAM, ROM, EPROM, EEPROM, and the like, and is preferably a look-up table (LUT) that stores values associated with flesh tone colors of a sample group.

The present invention realizes that people of different races have similar flesh tones. These flesh tones when analyzed in a three-dimensional color or RGB space are similarly distributed therein and hence lie essentially along a similar vector. It is this realization that enables the system to store flesh tone colors in a manner that allows for the rapid retrieval of color information. The flesh tone color values are created by sampling a reference set of people, e.g., 12–20 people, and then creating a histogram or spatial distribution representative of each of the three primary colors that constitute flesh tone, e.g., red, blue and green, using the reference set of people as a basis in ST color space ($H_f$). Alternatively, separate histograms for each color can be created. The color histogram is obtained by first reducing the 24 bit color to 18 bit color, generating the color histogram, and then transforming or converting it into ST color space from the intensity profile in the RGB space. The system then obtains the non-face color histogram in ST color space ($H_n$). This is obtained by assuming that non-face color is also uniformly distributed in the RGB space. The histogram is then converted into ST color space. The transformation into ST color space is performed according to the following two equations:

$$S=(B-G)/(R+G+B) \tag{Eq. 1}$$

$$T=(2R-G-B)/(R+G+B) \tag{Eq. 2}$$

The color histograms are then normalized by converting $H_f$ and $H_n$ to $P_f$ and $P_n$ according to Bayes Rule, which determines the face probability within the color space. Consequently, the normalized face can be represented as:

$$P_{face}=P_f/(P_f+P_n) \tag{Eq. 3}$$

The system then calculates the width and height of the table, as well as the values of the face probability look-up table 60 according to the following formula:

$$LUT[i]=P_{face}[i]\times 255 \tag{Eq. 4}$$

A certain portion of the resultant histogram(s) is then defined, for example, about 90% of the histogram or class width, for each of the colors in the histogram. This defines upper and lower limits of color values that are deemed acceptable by the system when determining whether the input pixel values of the frame 44 are representative of flesh tone. These histogram color distributions are then stored in the color table 60.

The system 20 further includes a color adjustment stage 62 that is employed to change or to adjust the flesh tone color values stored within the table. For example, if additional people are sampled, these color distribution values can be combined with the histogram values stored in the table.

Figure 4B:
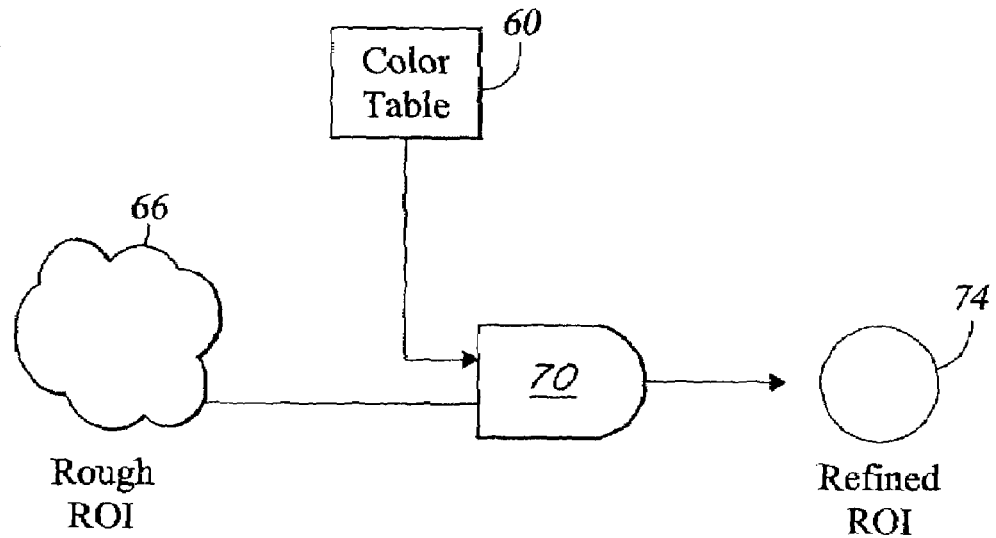
FIG. 4B is a schematic illustrative depiction of the manner in which color values stored in the color table are combined with a region of interest generated by the detection stage of FIG. 3 in accordance with the teachings of the present invention.

With reference to FIG. 4A, during face detection, the color table values 64 are introduced to a color reduction stage which reduces the color from 24 bit to 16 bit for ease of handling. This can be performed using known techniques. The detection stage 50 then further defines the ROI. The detection stage 50 ignores darker colors by setting to zero any pixel having a value less than 16. The system also includes a threshold stage 84 that compares the rough ROI with a threshold value to convert it to a binary image. An erosion stage 86 performs an erosion operation on the binary image to remove noise and disconnect hair pixels from face pixels. The erosion operation reduces the size of an object by eliminating area around the object edges, and eliminates foreground image details smaller than a structuring element. This increases the spacing between the face and the hair in the image. The erosion operation can be performed as follows:

$$A \oplus B = \bigcap_{b \in B} (A)_{-b} \text{ if} b(x, y) \text{ then} - b(-x, -y) \quad \text{(Eq. 5)}$$

Those of ordinary skill will realize that erosion is the intersection of all translations, where a translation is the subtraction of a structuring element set member from an object set member. The symbol $\circledx$ is used to signify the erosion of one set by another. In equation 5, A is the set representing the image (ROI), B is the set representing the structuring element, and b is a member of the structuring element set B. Additionally, the symbol $(A)_{-b}$ denotes the translation of A by –b. After the erosion operation is completed, the detection stage 50 performs the connected component blob analysis 56 on the ROI.

After the blob analysis is performed on the image by the blob detection stage 56, the a dilation stage 88 performs a dilation operation thereon to obtain the face regions within the ROI. The dilation operation is employed to expand or thicken the ROI, and is thus the inverse operation of erosion. Furthermore, the dilation operation is the union of all translations of the image by the structuring element members, and is defined as follows:

$$A \oplus B = \bigcup_{b \in B} (A)_b \quad \text{(Eq. 6)}$$

The symbol $\oplus$ signifies the erosion of one set by another. In equation 6, A is the set representing the image, B is the set representing the structuring element, and b is a member of the structuring element set B. Additionally, the term $(A)_b$ represents the translation of A by b. According to one practice, the set B can be defined as including the following coordinates $\{(0, 0), (0, 1), (1, 0), (1, 1)\}$. The output of the dilation stage is the ROI. The system can further process the image data by defining the largest area as the dominant face region, and merge other smaller face regions into the dominant face region. The center of the ROI is then determined by placing a 128×128 pixel box on the ROI (e.g., face) by setting its center as:

X center=X (mean of dominant face region)
Y center=top of the face region+average_sampled_face_height/4

The foregoing detection stage 50 hence compares the rough ROI with the contents of the color table 60, performs selected erosion and dilation operations to obtain the pixels associated with the face (by analyzing chrominance values), and ultimately refines the ROI based on the contents of the color table 60. The entire operation is illustratively shown as a logic operation in FIG. 4B. Specifically, the detection stage 50 inputs data associated with the blob or rough head ROI 66 generated by the blob detection stage 56 to one input terminal of an AND gate 70. The color table 60 is coupled by communication pathway 64 to the other input of the AND gate 70. The illustrated gate 70 performs a logic operation on the inputs and generates an output image that corresponds to the overlap of identical data values at the input. This operation serves to refine the rough ROI. The rough ROI is tightened or made smaller than, or maintained approximately the same size as the rough ROI, since the flesh tone colors that exist in the ROI and which match the stored color values in the table 60 are retained, while colors in the ROI that are not stored in the table 70 are discarded. Hence, the ROI is processed to produce a refined ROI 74 that more closely resembles the person's head. Those of ordinary skill will realize that the foregoing logic operation is merely exemplary of the refinement feature of the invention, and can be implemented in software as well as hardware.

A significant advantage of employing the motion detection stage 54 and the color table 60 in defining the ROI corresponding to the head is that these features can be performed in real-time, since there is generally no processing and hence time cost associated with employing the motion detection and color features of the detection stage 50. Specifically, the motion detection stage 54 determines motion within the field of view prior to the system actually needing to utilize the acquired image information. For example, a person initially entering the field of view in a secured area generally does not require immediate access to the secured facility. In the meantime, the system 50 detects motion, blobs together pixels that roughly correspond to the person's head, and then refines this ROI using pre-stored flesh tone colors according to the above techniques. This is performed in real-time, with minimal processing cost and inconvenience to the person. Additionally, refining the ROI allows the system to more quickly and accurately locate an object, such as the eyes, within the ROI, since the ROI has been closely tailored to the actual size of the hand of the person.

Figure 5:
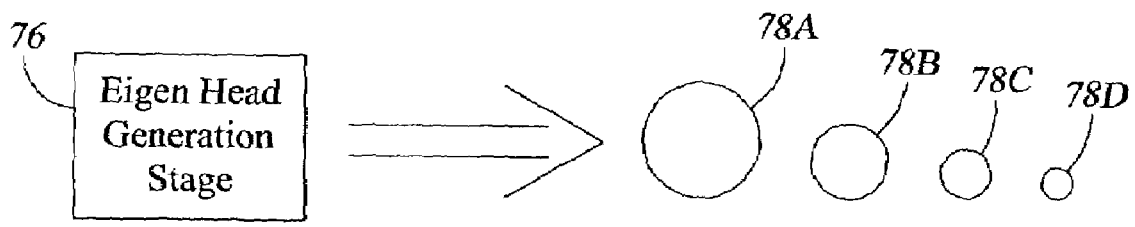
FIG. 5 is a schematic depiction of the scaling and low resolution eigenhead feature of the present invention.

With reference to FIGS. 3 and 5, the detection stage 50 can also define the head ROI when the system first detects motion followed by subsequent frames where no motion is detected, that is, when the object or person within the field of view is immobile, or the acquired image data is static. This may occur when a person originally enters the field of view and then immediately stops moving. The illustrated detection stage 50 includes an eigenhead generation stage 76 that generates eigenvectors that correspond to a head using PCA theory and techniques. Specifically, the eigenhead stage 76 initially samples a training set of individuals and performs a PCA operation thereupon to generate a series of eigenheads that define the distribution of heads within a multi-dimensional image space. The eigenheads employed by the present invention are preferably low resolution eigenheads, such as between about 17×17 pixel and about 64×64 pixel resolution, and preferably about 21×21 pixel resolution, since a rough size match rather than intricate feature matching is all that is required to quickly define the ROI. An advantage of employing low resolution eigenheads is that they are relatively fast to process.

The eigenheads generated by the eigenhead stage 76 are further scaled to various sizes, illustrated as head sizes 78A–78D, to enable a complete and accurate correlation match. Specifically, the ROI is searched using an eigenhead (e.g., with eigenhead 78A) of a particular size as a windowing function, and the system determines if there is a sufficiently high correlation match. If no match is found, then the eigenhead is scaled downward, for example, to eigenhead size 78B, and again the motion ROI is searched with this eigenhead template. This process is repeated until a match is found. If none is found, then the eigenhead templates are scaled upwards in size. Hence, the detection stage 50 employs a multi-scale correlation technique to identify a ROI corresponding to a person's head by searching the ROI with a variable-sized eigenhead template to determine if there is a correlation match.

FIG. 6 is a more detailed schematic representation of the primary eye find stage 30 of FIG. 1. As described above, the output of the detection stage 50 is a series or list of ROIs corresponding to a person's head (head ROI). The ROI is passed through a head center and scaling stage 110 that centers and scales the ROI for subsequent use. Specifically, the center and scaling stage 110 determines the coordinates of the center of the region of interest. The head center coordinates can be determined by calculating the mean value of the contours of the ROI. The size of the head ROI is estimated as the mean distance from the head center to the contour edges of the ROI. This information is useful for determining the approximate location of the eyes within the ROI, since the eyes are generally located within a rough geometrical area of the overall head ROI.

The output signal 112 generated by the center and scaling stage is communicated to a first eye find stage 120 which comprises part of the overall identification system 20 and specifically the primary eye find stage 30. The first eye find stage 120 is adapted to receive a number of input signals carrying a variety of different image data or information. In particular, the frame data signal 44 generated by the frame grabber 26 is received by the first eye find stage 120. Additionally, an eigeneye template module 130 generates and stores a number of eigenfeature or eigeneye templates corresponding to a training set of images. The eigeneye templates can be constructed in known fashion, the general construction of which is described in further detail below. The eigen template module generates an output signal that is also received by the first eye find stage 120.

Figure 7A:
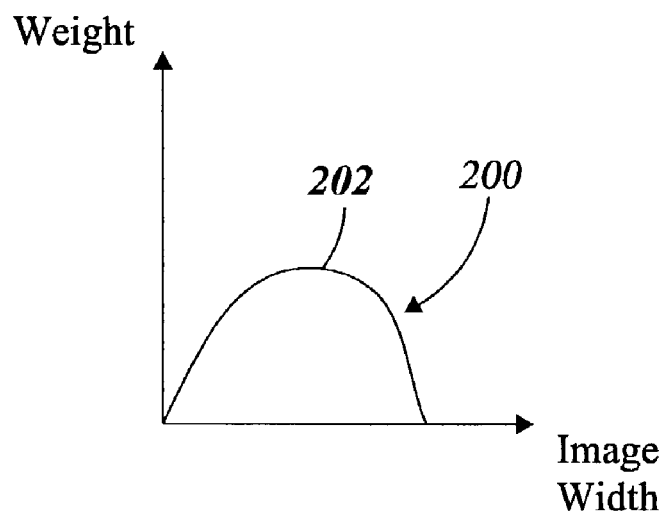
FIGS. 7A through 7C illustrate various embodiments of a center-weighted windowing functions employed by the facial recognition system according to the teachings of the present invention.
Figure 7B:
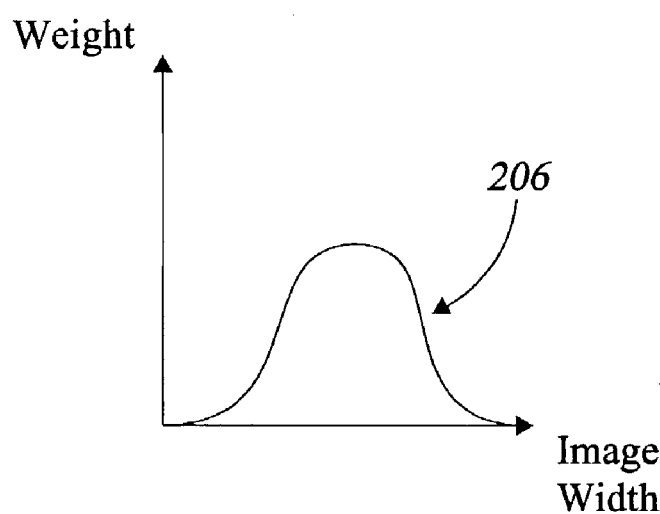
Figure 7C:
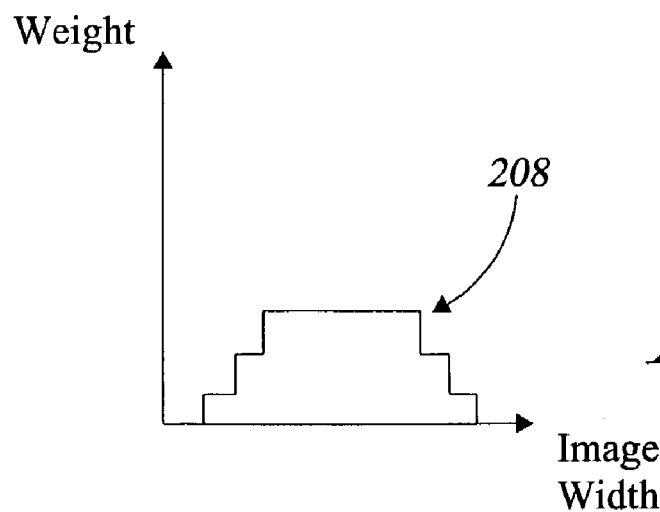

Additionally, the eigeneye template module 130 and preferably the first eye find stage 120 employs a selected weighting profile, or windowing function, when correlating the ROI with the eigeneye templates. In particular, the system 20 employs a center-weighted windowing function that weights image data more strongly in the middle portion of the image while conversely weighting data less strongly towards the outer regions of the image. FIGS. 7A through 7C illustrate exemplary weighting profiles 202, 206, 208 employed by the eye find stage 30 of the invention. FIG. 7A graphically illustrates one such weighting profile, and defines image data width along the abscissa, and normalized data weight along the ordinate. The illustrated weighting profile 200 has a sinusoidal-shape and is employed by the present invention as a window function. The function weights image data in a central region 202 of the window more strongly than image data at the edges of the image. Hence, the system accords the most weight to image data that has the highest percentage chance of being incorporated into the eigen template during production of the same. Conversely, the weighting profile accords less significance, and preferably little or no significance, to image data located at the boundary regions of the image. This center-weighting window function ensures that the system maximizes the incorporation of essential image data into the correlation, while consistently minimizing the chance that unwanted extraneous information is employed by the system.

The system 20 places the window function over a selected portion of the ROI, and then analyzes the ROI using this window function. The window function shape thus defines that selected portion of the image to be analyzed by the system of the invention. The illustrated sinusoidal-shape of the window function 200 thus weights more heavily data corresponding to the portion of the ROI that overlaps with the center portion of the function relative to the outer boundaries of the function. The use of a center-weighted window function enables the system 20 to avoid incorporating unwanted image data into the eigen template. The image data may be accidentally corrupted when employing conventional window functions by including unwanted data associated with adjacent facial features, shading, and other illumination perturbations. The system avoids incorporating this unwanted data into the eigentemplates, thereby minimizing the likelihood of the system generating false matches.

The significance of the window function shape employed by the identification system 20 of the present invention can be further illustrated by a simple example. For instance, eigenfaces can be created from a training set of images in accord with PCA principles described in greater detail below. One or more features of the acquired facial images can be utilized to form selected eigentemplates of a particular facial feature. In one example, eigenvectors corresponding to eyes, and thus called eigeneyes, can be created from the training images forming part of the training set. Variations among eyes are prevalent in the training set of images because of the various people that constitute the training set. Additional factors, however, influence the random variations of the images. For example, if a particular individual's image was captured while the person was wearing eyeglasses, the system may inadvertently include data associated with the eyeglass frame and other glassware components when generating the eigenface. If a standard weighting profile where image data is valued equally thereacross were employed to analyze data corresponding to areas surrounding each eye, the eye portion of the image may include information corresponding to the eyeglass frame. As is obvious to one of ordinary skill, this additional information corrupts the overall acquired image data, and when projected onto the image space, may actually distort the spatial location of the eye within this image space. Specifically, the eye may be spatially shifted right or left, thus destroying the true spacing between eyes as well as the particular orientation of the eye relative to other facial features. Since this information is utilized by the system to generate templates, which themselves are employed to identify matches with a newly acquired image, the system could be prone to false matches.

FIGS. 7B and 7C illustrate yet other examples of weighting profile shapes that can also be employed by the eye find stage 30 of the present invention. In particular, FIG. 7B illustrates a bell-curve type weighting profile 206 that also accords stronger weight to a middle portion of the image as opposed to the peripheral or boundary regions. Likewise, the step function 208 further accords, in a stepwise fashion, more weight to image located within the interior regions of the image as opposed to the outer regions. Those of ordinary skill will readily recognize that other possible window shapes can be employed by the system 20 without departing from the spirit and scope of the invention.

An advantage of employing the eigeneye templates in the eye find stage 120 is that PCA projections in image subspace require little or no processing time, and thus are simple and efficient to use in facial reconstruction systems. Since the Eigenface method is based on linearly projecting an image onto multi-dimension image space, this method yields projection directions that maximize the total scatter across all the facial images of the training set. The projections thus retain unwanted variations due to lighting and facial expression. This scatter can be greater than the conventional scatter that is produced in the projections due to variations in face identity. One method to overcome this scatter is to include in the training set a number of different images that mimic the continuum of lighting conditions in order to more evenly distribute points in the image space. These additional images, however, could be costly to obtain and require significant intrusions on the training people. Furthermore, analyzing and manipulating this additional data becomes significantly cumbersome and computationally burdensome. One technique to address the scatter in the eigenimages is to correct for the variations in lighting and expression during the image manipulation stage 34 or during any other convenient stage of the illustrated facial recognition system 20.

Those of ordinary skill will recognize that a correlation in the Eigen approach is a nearest neighbor classifier scheme in image space. For example, a new image (e.g., the ROI) can be classified (recognized) by assigning to it the label of the closest point in a reference set, as measured in the image space. Since all of the images are normalized to have zero mean and unit variance, classifying the nearest match is equivalent to correlating the new image with each image in the reference set to determine the closest match. This correlation can be performed using the traditional Eigen approach, or can be performed by calculating the eigen coefficients using a fast Fourier transform (FFT) approach to generate a correlation map. According to a preferred practice, the system 20 employs the FFT approaching the eye find stage 20, and specifically to any selected input to the head find stage 28 or the eye find stage 158 to perform the correlation between the newly acquired image and one or more reference images.

One example of employing this FFT approach is as follows. The input image is initially acquired and digitized, and then processed by the detection stage 50. Having captured a static image of interest by the techniques and methods previously and hereinafter described, the image (e.g., frame data and/or eigeneyes) is reduced to a digital representation of pixel values. These pixel values correspond to the measure of the light intensity throughout the image. As an example, an image may be digitized to form a rectangular or square array of pixel values which are indicative of the light intensity within the image. For example, a facial image can be reduced to N rows by M columns of pixel data resulting in an aggregate of N×M pixel values. Each of these pixel values can be identified as to location by row and column. Consequently, it is natural to represent the digitized image as a discrete function of luminescence or light intensity that varies by pixel location. Such a function is represented as $I(x_i, y_j)$ where $x_i$ designates a row of pixel locations and $y_j$ identifies a column of pixel locations, thus identifying an individual pixel within the image.

In certain image processing applications, it is desirous or necessary to identify or recognize a distinctive object (ROI) or feature within the larger image. For example, in a security application, it may be necessary to identify an individual's face from a larger reference set of faces of individuals authorized to access a secured location. Conventionally, this has been accomplished by storing a digital representation of the face of each authorized individual in a vector or matrix representation. The digitized facial image of the person requesting access to the secured resource is then matched against the set of reference faces authorized for access to the resource in order to determine if there is a match. The matching process has conventionally been performed by a mathematical correlation of the digital pixel values representing the face of the individual requesting access with the pixel values of the faces from the reference set. In mathematical terms the correlation is represented by the value $$\sum_{i=1}^{N}\sum_{j=1}^{N} I(x_i, y_j) I_R(x_i, y_j) \quad \text{(Eq. 7)}$$

where $I(x_i, y_j)$ is the luminescence value for the facial image to be detected at each of the pixel values and $I_R(x_i, y_j)$ is the corresponding facial image from the training set. The correlation is performed for each image from the training set. It is well known that a good match of digital data is represented by a large correlation value, and thus the reference image with the greatest correlation is considered the best match to the image to be detected. A predetermined thresholding value is set so as to ensure that the match is sufficiently close. If all the calculated coefficient values are below the threshold value, it is presumed that the detected face or feature is not found in the matching reference set.

Since the object or feature to be identified may comprise only a subset of the larger image, the images from the reference set must be correlated over all possible subsets of the image in order to detect the object or feature within the larger image. Using the previous security example, the face to be identified or detected may exist within a background of unrelated objects, and also positioned at almost any location within the larger image. Thus, the reference faces are correlated with all possible subsets of the image to find and to identify the face to be matched.

Figure 8:
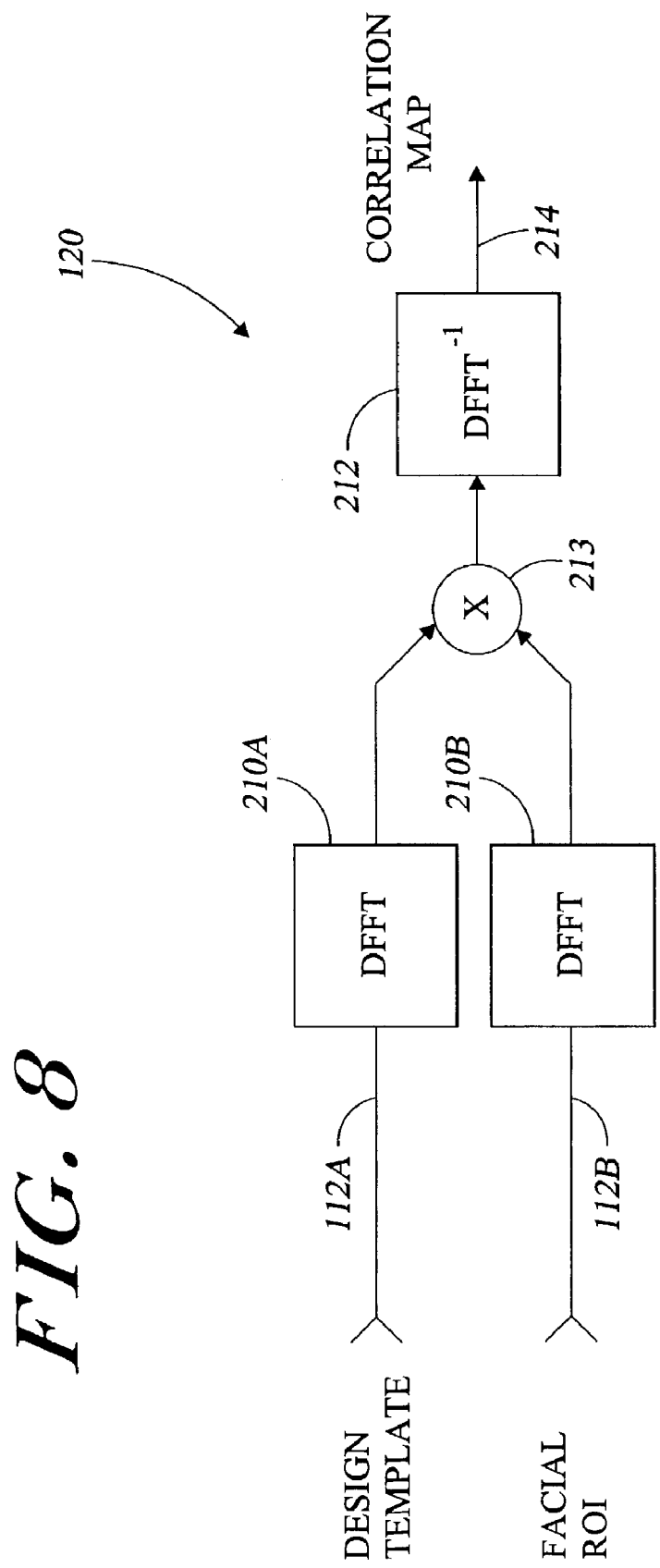
FIG. 8 is a block diagram depiction of the fast Fourier transform stage for generating a correlation map.

FIG. 8 is a schematic block diagram depiction of the eye find stage 120 which can employ, among other things, the Discrete Fast Fourier Transform (DFFT) approach described above. Specifically, the eye find stage 120, for example, can employ DFFT procedures to correlate the ROI with the eigen template, such as the eigeneye templates, to produce a correlation map. It has been realized that the expressions for the correlation may be calculated in a more efficient fashion using an DFFT approach. Specifically, the expressions may be computed by transforming the calculation to the frequency domain, and then performing an inverse transform operation to obtain the result in the spatial domain. It has been realized that the sum of products in the space domain is equivalent to the product of the DFFT in the frequency domain. An inverse DFFT transform of this product then produces the required result. By transforming the computation into the frequency domain, the inherent efficiency of the DFFT can be utilized to significantly reduce the overall number of calculations required to obtain the results.

According to one practice, the eye find stage 120 receives a template 112A from the eigeneye template stage 130. The eye find stage 120 employs one or more transform stages 210A and 210B to convert the eigen templates and the ROI signal 112 into the frequency domain to reduce the amount of computations necessary to produce the correlation map 214. The DFFT stages 210A, 2101B reduce the amount of computations since rather than constructing a map by summing the products of the templates and the ROI, the eye find stage 120 of the invention merely acquires the dot product, in the frequency domain, of the input signals by transforming the image and template into the frequency domain. The converted data is then multiplied by the multiplier 213 to perform the foregoing dot product. The eye find stage 120 then reconverts the data into the spatial domain be employing the inverse transform stage 212. The stage 120 hence generates a correlation map identical to that generated employing the conventional spatial technique, without manipulating large, complex equations. Hence, the system is faster, more responsive to input image data, and is capable of generating correlation maps in real-time.

Figure 9:
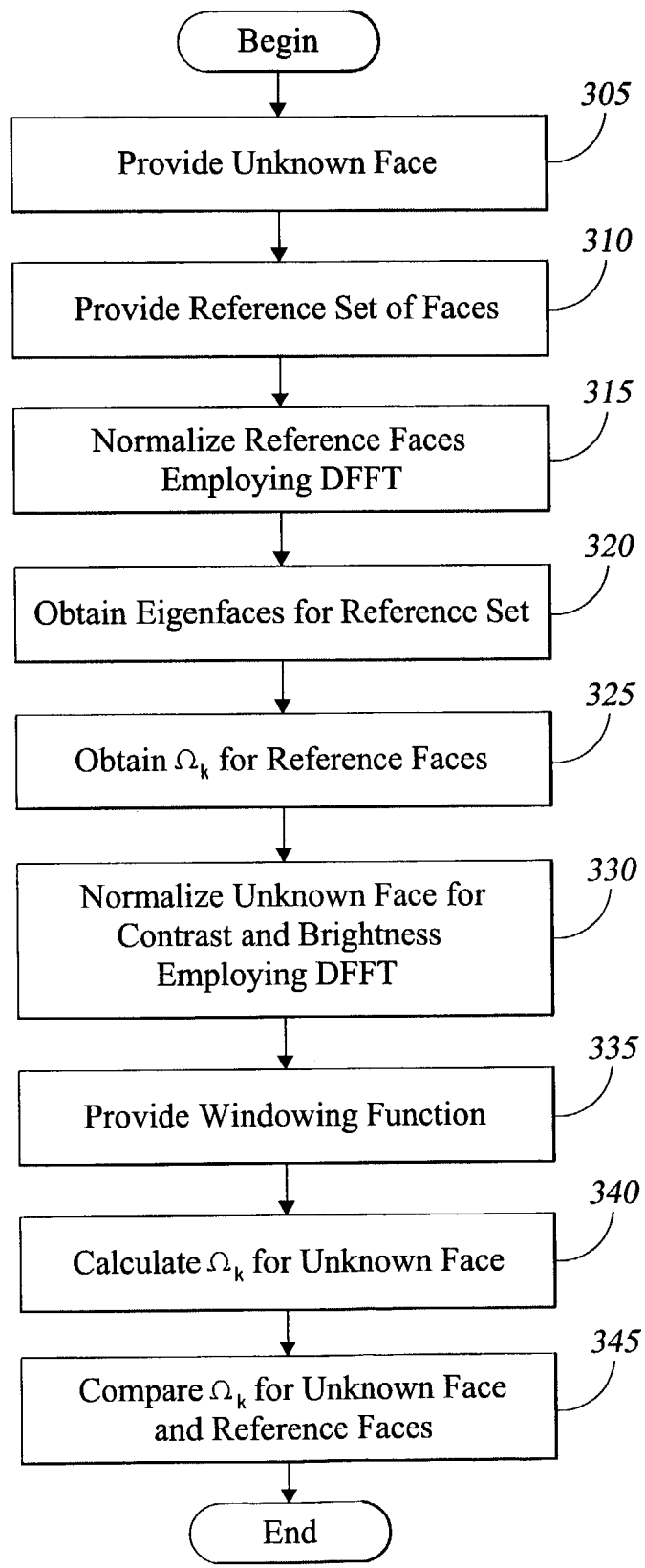
FIG. 9 is a flow-chart diagram illustrating the generation of the eigenfaces by employing a dot product in accordance with the teachings of the present invention.

FIG. 9 is a schematic flowchart diagram illustrating the operations employed to identify an individual face within a larger image. The system first generates a digitized image consisting of a face that is to be matched to a particular face in a reference set of stored faces, as set forth in steps 305 and 310. Each face within the reference set of faces is then normalized and converted into the frequency domain using the DFFT 210A, and a set of basis vectors (e.g., eigenfaces or eigeneyes), $\mu_k$, that span the set of known reference faces is obtained employing conventional Eigen techniques. This is set forth in steps 315 and 320.

According to step 325, the system then obtains the component coefficients $\Omega_k$ in terms of the basis vectors $\mu_k$ for each face within the reference set of faces by employing a dot product operation. This can be performed in the eye find stage 120. As illustrated, the stage 120 receives the centered and scaled ROI and an eigen eye template from the template stage 130. The eye find stage can employ a program or hardwired system that converts the eigeneye data into vector coefficients in the frequency domain. The resultant operation forms a vector $\Omega=(\Omega_1, \ldots, \Omega_M)$ of component coefficients for each face in the reference set.

The system then normalizes the unknown facial image, as set forth in step 330, for contrast and brightness for each reference image, and converts the normalized image data into the frequency domain using DFFT 210B. The system then defines a windowing function of the type described above (e.g., center-weighted function) to emphasize selected local features or portions of the image. This is set forth in step 335. The system then overlays the image on the windowing function, and calculates a set of component coefficients $\Omega$ for the unknown image in terms of the eigenfaces $u_k$ using a dot product operation, step 340. Finally, as set forth in step 345, the system compares the component coefficients $\Omega$ of each face from the reference set with the coefficients of the unknown image to determine if a match exists.

The illustrated system 20 thus provides an integrated real-time method of detecting an individual face within an image from a known reference set of faces by converting the template and ROI data into the frequency domain, obtaining the dot product, and then reconverting the data into the spatial domain to develop a correlation map. One of ordinary skill in the art will readily recognize that while the method and techniques employed are described in terms of a face detection application, the advantages and benefits of the invention are not limited to this application. In general, the invention can be used to advantage in any application with the need to identify or detect an object or feature within a digitized image, such as a head or eyes of an individual. Moreover, in the most general application of the invention, a known data structure or pattern of digital data from a reference set of such data structures can be identified within a larger set of digitized values.

In an alternate embodiment, the system can also input data associated with eye clusters generated by the eye cluster stage 140. The Eye cluster stage 140 logically organizes a reference set of eye images into clusters in order to develop templates that used by the eye find stage 120 to locate the eyes. Specifically, as described above, the eye find stage 120 compares the centered ROI with the eye cluster template to determine the existence of a match. Those of ordinary skill will readily understand the use of eye clusters, and in accordance with the teachings of the present invention, how they are implemented by the present system to locate a region in the ROI.

Referring again to FIG. 6, the eye find stage 120 receives the original image frame data 44 and the ROI that has been scaled and centered by the scaling stage 110, and performs a correlation match with the eigen eye templates and windowing function to determine the eye locations within the image. As set forth above, this correlation can be performed in the spatial or frequency domain. If the eye find stage 120 produces a sufficiently high correlation, and thus locates the eyes within the image, the stage generates an output signal 122 that is indicative of eye locations, and which is received by the compression stage 37.

When the first eye find stage 120 is unable to determine the eye location, the system 20 reverts to a backup technique that employs the second head find stage 146 and the second or back-up eye find stage 156. In particular, the first eye find stage 120 generates an output signal 121 that serves to actuate the frame grabber 26 to re-acquire an image, while concomitantly generating an input signal for the head find stage 146.

Similar to the first eye find stage 120, the second head find stage 146 receives the original frame data 44, the eye find stage output signal 121, as well as eigenhead templates stored in the eigenhead template stage 150. The eigenhead templates are generally low resolution eigenheads produced by the foregoing Eigen technique. The second head find stage 146 performs a correlation match employing the eigenhead templates stored in the eigenhead stage 150, and which correspond to the previously captured region of interest. Assuming there is a match at this stage, the system 30 produces an output signal which actuates a second eye find stage 156, which receives signals similar to the first eye find stage 120, to again attempt to locate the eyes. If the system fails the second time to determine the eye locations, the system produces an output signal 158 which actuates the frame grabber 26 to reacquire an image. The redundant head and eye find stages 146 and 156 increase the eye location accuracy of the system. Those of ordinary skill will recognize that there is a tradeoff between accuracy and time when determining whether a newly acquired image matches a pre-stored image. The illustrated system 20 attempts to balance these competing concerns by opting for the fast, real-time initial approach of locating the eyes with the first eye-find stage 120. If this fails, however, the system employs the head find and eye find stages 146 and 156 in order to improve the overall accuracy of the system.

Figure 10:
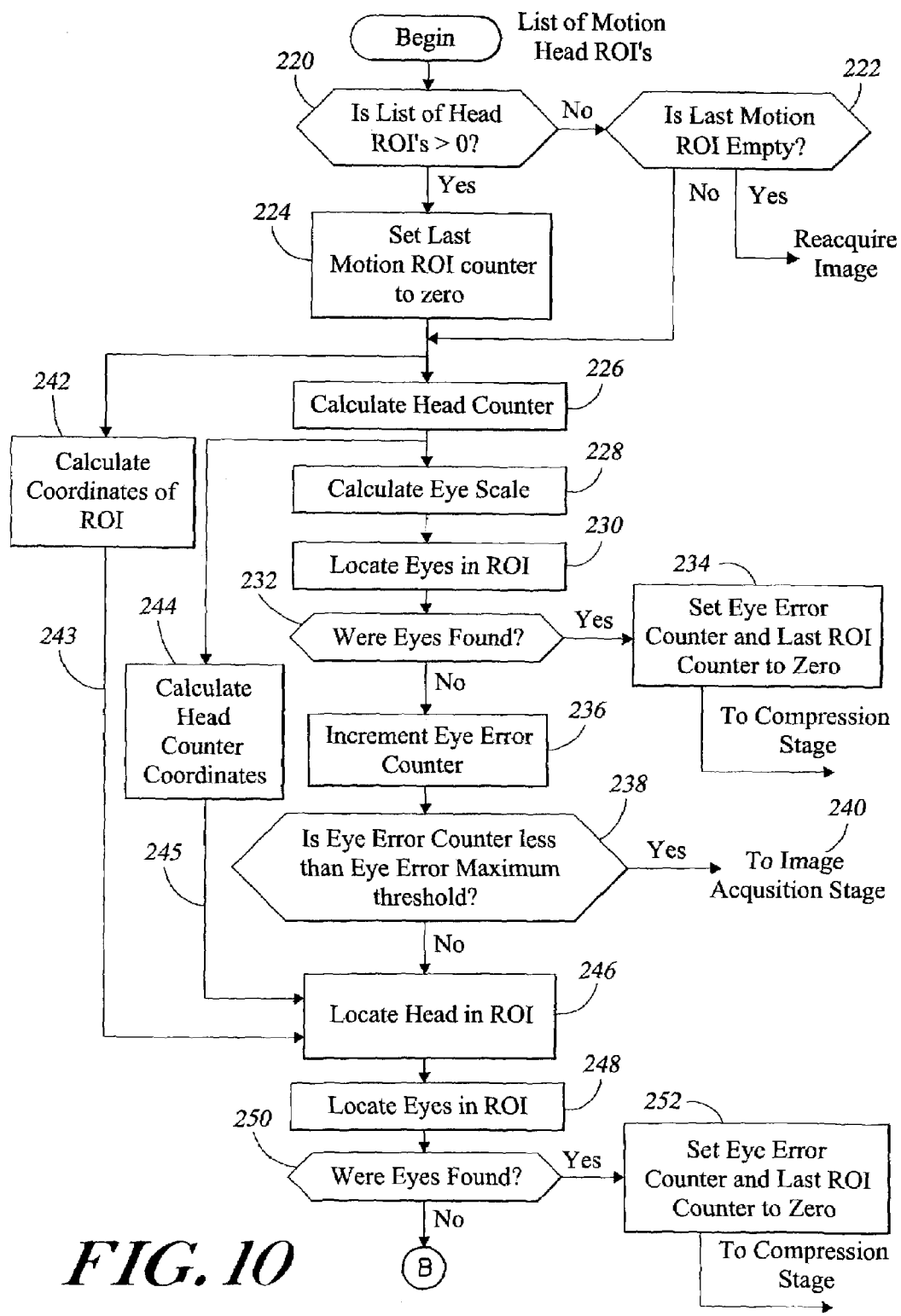
FIGS. 10 and 10A are flow-chart diagrams illustrating the acquisition and determination of a selected region of interest by the facial recognition system according to the teachings of the present invention.
Figure 10A:
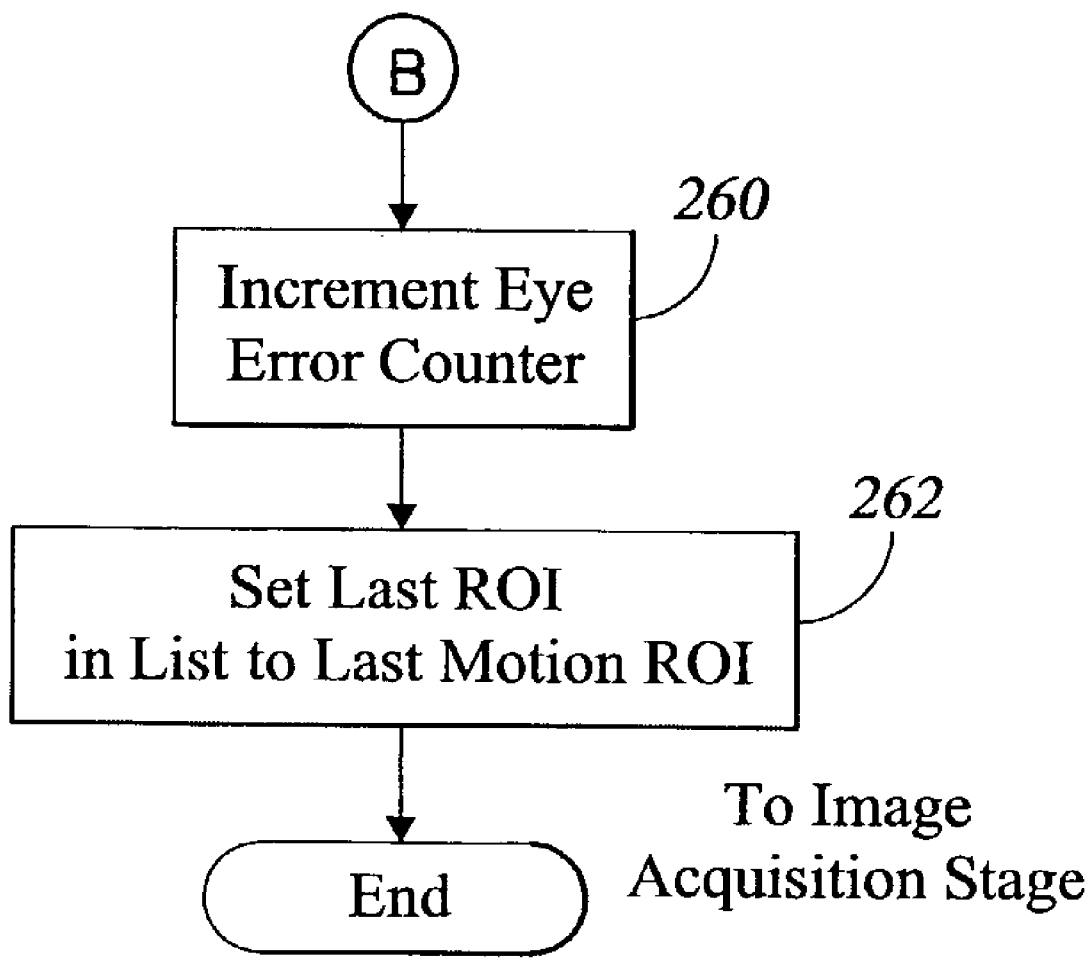
Figure 11:
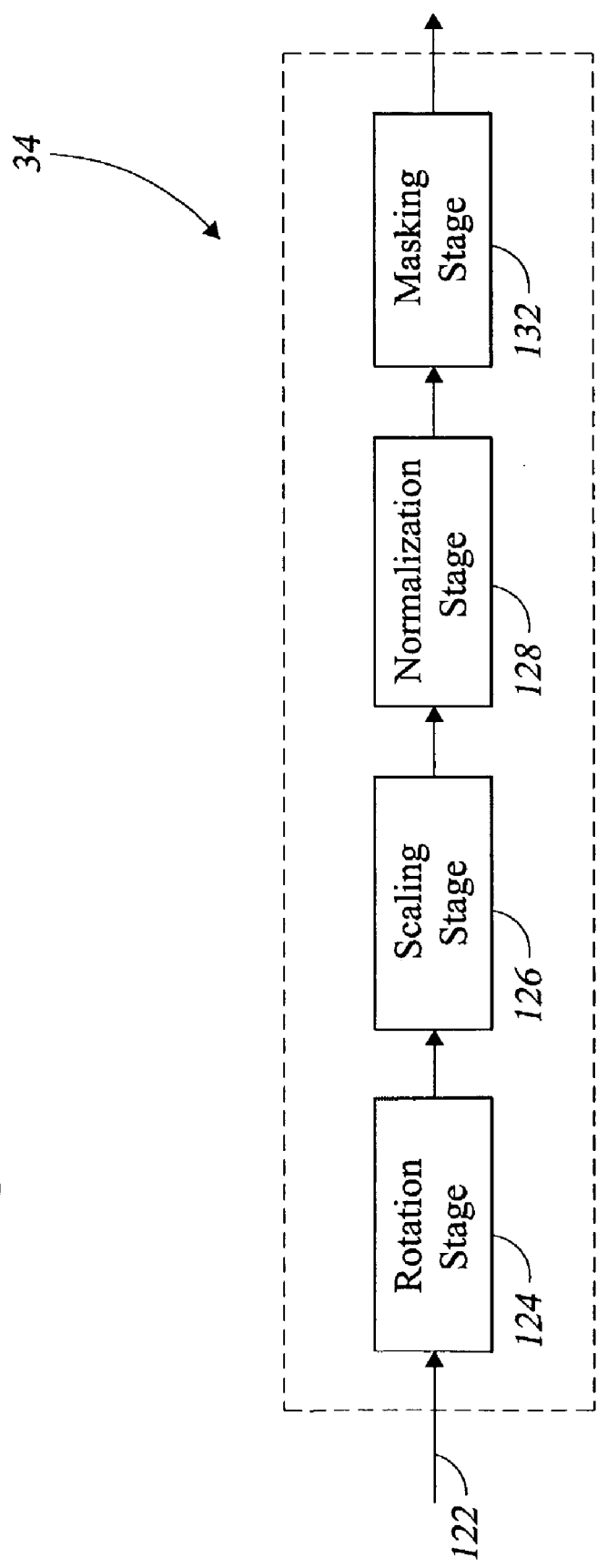
FIG. 11 is a more detailed schematic block diagram depiction of the image manipulation stage of FIG. 1 in accordance with the teachings of the present invention.

The operation of the primary eye find stage 30 of FIGS. 1 and 6 is further illustrated in the flow chart schematic diagrams of FIGS. 10 and 10A. In particular, the head ROIs produced by the detection stage 50 of FIG. 3 serve as the input to the primary eye find stage 30 of FIG. 6. The system then determines if the number of ROIs within the image are greater than zero. This is determined in step 220. If the number is greater than zero, the system sets a motion ROI counter to zero, as set forth in step 224, and then proceeds to further process the ROI. Conversely, if the system determines that the number of head ROIs is not greater than zero, then the system determines whether the last ROI is devoid of appropriate image data, as set forth in step 222. If the image is devoid of image data, then the system actuates the image acquisition device 22 and frame grabber 26 to reacquire an image. If not, then the system proceeds to step 226, as set forth below.

After the system 20 determines that the last motion ROI contains data by setting the motion ROI counter to zero, the system calculates the head center within the image, as set forth in step 226. The system then proceeds to calculate the appropriate eye scale step 228, and then locates the eyes in the region of interest ROI, step 230. As set forth in step 232, if the system determines that the eyes in the ROI were located, then an eye error counter and the last motion ROI counter are set to zero, thus signifying that an accurate eye location operation has occurred. This is set forth in step 234. The system then passes the eye location image information onto the compression stage 37.

If the eyes were not successfully located, the system, as set forth in step 236, increments the eye error counter to signify that an error has occurred while attempting to identify or locate the eyes within the head ROI. The system 20 then reverts to a backup head find stage 146 and second eye find stage 156 to locate the eyes. In particular, the system once again locates the head in the region of interest, as set forth in step 246. This particular step is in feedback communication with two particular feedback loops 242 and 245. As illustrated in FIG. 8, the system calculates the spatial Cartesian coordinates of the ROI, as set forth in step 242. This step occurs after the motion counter has been set to zero in step 224. Additionally, the system calculates the head center coordinates, step 244, and which occurs after step 226. After the system locates the head for the second time in the ROI, as set forth in step 246, the system then attempts to locate the eyes. If the eyes are located this time, the system 20 proceeds to set the eye error counter and the last ROI counter to zero, as set forth in step 252 (similar to step 234). The eye location information is then transferred to the compression stage 37.

If the system again fails to locate the eyes, the error counter is once again incremented, as set forth in step 260, to signify that an additional eye location failure has occurred. The system then proceeds to set the last ROI in the list to a value equal to the last motion ROI, as set forth in step 262. Once the counter is set to a value corresponding to the last ROI, the system resets itself to accommodate additional ROI information generated by the detection stage 50. The system then repeats the entire process.

With further reference to FIG. 6, the eye location image data 122 is then transferred to the compression stage 37. Those of ordinary skill will recognize that prior to receipt of the eye location information by the compression stage 37, the information passes through an image manipulation stage 34, as set forth in FIGS. 1 and 10. The eye location information can initially pass through a rotation stage 124, which seeks to rotate the image information to a selected orientation to enable an accurate and appropriate comparison with pre-stored images. The rotated image data is then scaled by the scaling stage 126 to an appropriate size, and then normalized by the normalization stage 128 to attain a normalized image suitable for processing by the compression stage. Image data information not associated with the eyes is then masked, or removed, by the masking stage 132. The rotation stage 124, scaling stage 126, normalization stage 128, and masking stage 132, all employ conventional processes that are readily apparent to one of ordinary skill in the art.

The following methods and techniques employing PCA can be advantageously used to reduce computational requirements. The PCA methods can be applied to an image of an object, or an albedo of an object, since both the image and the albedo can be represented as a vector. Although reference will be made to an image of an object, and in particular to a face, it should be understood that the following PCA method can also be applied to albedo vectors, as long as there is a reference database of albedos to compare with.

The face to be detected from a training set of facial images can be represented as the intensity of the corresponding image as a function of position, $I(x_i, y_i)$. An albedo can likewise be described. These images can be represented by vectors. Let the training set of acquired face images be represented by $\Gamma_1, \Gamma_2, \Gamma_3, \ldots \Gamma_M$. The average face of this training set is defined by $$\Psi = (M)^{-1} \Sigma_n \Gamma_n \qquad \text{(Eq. 8)}$$

where the summation is from n=1 to M. Each training face differs from the average or mean face by a vector $\Phi_i = \Gamma_i - \Psi$. Thus, the mean is found by adding all the faces together in the training set and then dividing by the number of face images. The mean is then subtracted from all the face images. A matrix is subsequently formed from the resultant mean adjusted faces.

This set of very large vectors associated with the training faces is then subject to principal component analysis (PCA). The PCA establishes a set of M orthonormal vectors, $u_k$, which best describe the distribution of face data within the face space. The kth vector, $u_k$, is chosen such that:

$$\lambda_k = (M)^{-1} \Sigma_n (u_k^T \Phi_n)^2 \qquad \text{(Eq. 9)}$$

is a maximum, subject to:

$$u_l^T u_k = \delta_{lk} = \begin{cases} 1, & \text{if } l = k \\ 0, & \text{otherwise} \end{cases} \qquad \text{(Eq. 10)}$$

The vectors $u_k$ and scalars $\lambda_k$ are the eigenvectors and eigenvalues, respectively, of a rather large covariance matrix $$C = (M)^{-1} \Sigma_n \Phi_n \Phi_n^T \qquad \text{(Eq. 11)}$$

It has been recognized that the contrast and brightness of each of the images in the training set {Γi} may differ significantly from each other and from the image to be matched. These differences may skew the matching results, and thus create errors in detection. The present invention compensates for these differences. Specifically, the image to be matched is adjusted relative to each image from the reference set before correlation is performed. The statistical mean and standard deviation of all the pixel values for the individual reference image are determined, and the pixel value of the image to be matched are adjusted according to the following rule:

$$I_S(x_i,y_j)=cI(x_i,y_j)+b; \qquad (\text{Eq. 12})$$

where c and b are parameters that can be chosen to yield a normalized standard deviations and/or mean, and $I(x_i,y_j)$ are the original pixel values in the image to be matched.

According to a further practice, a windowing function is defined that weights the product of the corresponding luminescence values according to their significance in detecting the object within an image. For example, if one were attempting to find an eye within a facial image, a windowing function can be defined to emphasize the correlation of certain aspects of the reference eye and to avoid the confusion associated with peripheral features such as eyeglasses. In one embodiment of the invention, the windowing function has a shape corresponding to the previously-described center-weighted windowing function that accords greater weight or significance to pixel values in the center of the windowing map and lesser or no significance to those on the edges of the map, as shown in FIGS. 7A, 7B and 7C. This windowing map may be employed with a two dimensional circular geometry. Pixel values outside the bounds of the windowing map have a weight of zero, and thus do not enter into the correlation calculation.

The specific details of detecting an individual face within a larger image is described mathematically using the above described eigenface concept. The foregoing discussion while focused on identifying an individual's face within an image, can also be used in a more general sense to identify the head of an individual, the eyes of an individual, or any distinctive feature within an image. The set of basis eigenfaces is simply changed to the basis of eigenheads or eigeneyes. In the following discussion $\underline{x}$ and $\underline{y}$ are considered vectors which in component form would be written as $(x_i,x_j)$ and $(y_i,y_j)$.

The system 20 initially defines $w(\underline{x})$ to be a window function which is centered at $\underline{x}=0$ and has unit power, $$\sum_{i=1}^{N}\sum_{j=1}^{N} w^2(\underline{x}) = 1 \qquad (\text{Eq. 13})$$

Let $I(\underline{x})$ be the image to be analyzed, where $I(\underline{x})$ is moved under the window function to analyze it. The effect of brightness and contrast variations in the part of the image under the window is to be minimized by scaling $I(\underline{x})$ by a factor c, the standard deviation of the pixel values in the reference image undergoing analysis, and an additive constant b which is the mean of the pixel values in that reference image. Thus the family of images that result from contrast and brightness changes to image $I(\underline{x})$ can be modeled as $cI(\underline{x})+b$ which is expressed as $I_S\underline{x}$ To counter contrast and brightness variation, when $I_S(\underline{x})$ is shifted by an offset $\underline{y}$, to cause $w(\underline{x})$ to overlay different portions of the image, $I_S(\underline{x})$ maps to a new function $p(\underline{x},\underline{y})$ that has zero mean and unit power. That is, $$\sum_{i=1}^{N}\sum_{j=1}^{N} p(\underline{x},\underline{y})w^2(\underline{x}) = 0 \qquad (\text{Eq. 14})$$

and $$\sum_{i=1}^{N}\sum_{j=1}^{N} p^2(\underline{x},\underline{y})w^2(\underline{x}) = 1 \qquad (\text{Eq. 15})$$

These conditions require that $$p(\underline{x},\underline{y})=[I_S(\underline{x}-\underline{y})-m(\underline{y})]/s(\underline{y}) \qquad (\text{Eq. 16})$$

where $$m(\underline{y}) = \sum_{i=1}^{N}\sum_{j=1}^{N} I_s(\underline{x}-\underline{y})w^2(\underline{x}) \qquad (\text{Eq. 17})$$

and $$s(\underline{y}) = \left[\sum_{i=1}^{N}\sum_{j=1}^{N} [I_s(\underline{x}-\underline{y})-m(\underline{y})]^2 w^2(\underline{x})\right]^{1/2} = \qquad (\text{Eq. 18})$$

$$\left[\left(\sum_{i=1}^{N}\sum_{j=1}^{N} I_s(\underline{x}-\underline{y})w^2(\underline{x}) - 2m(\underline{y})\right)\cdot\left(\sum_{i=1}^{N}\sum_{j=1}^{N} I_s(\underline{x}-\underline{y})w^2(\underline{x}) + m^2(\underline{y})\right)\left(\sum_{i=1}^{N}\sum_{j=1}^{N} w^2(\underline{x})\right)\right]^{1/2}$$

$$= \left[\sum_{i=1}^{N}\sum_{j=1}^{N} I_s^2(\underline{x}-\underline{y})w^2(\underline{x}) - m^2(\underline{y})\right]^{1/2}$$

Note that for any value of c and b, $cI(\underline{x})+b$ map to the same function $p(\underline{x},\underline{y})$.

The function $p(\underline{x}, \underline{y})$ can be described in terms of its coefficients with respect to a set of eigenbasis functions $u_k(\underline{x})$. These coefficients, which are designated as $\Omega_k(\underline{y})$, are defined as the inner products $$\Omega_j(\underline{y})=(u_j(\underline{x}),p(\underline{x},\underline{y})).$$

The basis functions are computed from the set of reference images $\Gamma_i$ that were properly aligned so that the feature of interest (e.g., the face to be identified) is centered at the zero point in every reference image, and the eigenfaces previously described are represented as:

$$\Omega_k(\underline{y}) = \qquad (\text{Eq. 19})$$

-continued $$\sum_{i=1}^{N}\sum_{j=1}^{N}p(x,\underline{y})u_k(x)w^2(x) = \left[\left(\sum_{i=1}^{N}\sum_{j=1}^{N}I_s(x-\underline{y})u_k(x)w^2(x) - m(\underline{y})\left(\sum_{i=1}^{N}\sum_{j=1}^{N}u_k(x)w^2(x)\right)\right]\right/s(\underline{x})$$

For convenience, we will also stipulate that $$\sum_{i=1}^{N}\sum_{j=1}^{N}u_k(x)w^2(x) = 0 \qquad (\text{Eq. 20})$$

This gives $$\Omega_k(\underline{y}) = \left[\sum_{i=1}^{N}\sum_{j=1}^{N}I(x-\underline{y})u_k(x)w^2(x)\right]\!\!\Big/s(\underline{y})$$

The weights $\Omega_k$ form a vector $\Omega^T = [\Omega_1 \ \Omega_2 \ \ldots \ \Omega_M]$ describing the contribution of each eigenface in representing the new input face image, thus treating the eigenfaces as a basis for the face images.

The foregoing vector can then be used in a standard pattern recognition algorithm to determine which of the faces from the reference set, if any, best matches the unknown face. The simplest method for determining which face class provides the best description of an input face image is to find the face that has a representation in terms of the eigenface basis vectors with a minimum Euclidean distance between the coefficients, $$\epsilon_k = \|(\Omega - \Omega_k)\|.$$

The compression stage 37 performs an eigenvector procedure. In one embodiment, the procedure is performed by first obtaining a training set of faces by acquiring a number of training images. The training set is normalized, as described above, so that all faces are the same scale, position, orientation, mean, and variance. The actual encoding or compression process can employ a Karhunen-Loeve transformation or an eigenvector projection technique, which encodes an image of a person's face or other facial feature, such as nose, eyes, lips, and so forth, as a weighted set of eigenvectors. This eigenvector projection technique is described more fully in U.S. Pat. No. 5,164,992, entitled "Face Recognition System", issued to Turk et al., the contents of which are hereby incorporated by reference. As described therein, an image of a face is projected onto a face space defined by a set of eigenvectors. The set of eigenvectors, or eigenfaces, can be thought of as a set of features which together characterize the variation between face images within a training set of facial images. This distribution of faces in the training set of faces can be characterized by using principal component analysis to extract face information that characterizes the variations or differences between a newly acquired image (the projected image) and the eigenfaces. Principal component analysis (PCA) is a known technique. The resulting eigenvectors produced by performing the PCA define the variation between the face images within the training set of faces, and can be referred to as eigenfaces. Thus, an eigenface is formed by multiplying each face in the training set by the corresponding coefficient in the eigenvector. Once the eigenfaces are identified an image signal can be represented as a function of these eigenfaces by projecting the image signal into the space defined by these eigenfaces. Once again it will be emphasized that the PCA method can be applied to an image of an object, or an albedo of an object, although sometimes in the discussion reference will be made only to the former.

To implement the foregoing approach, K face images (or face albedos) are obtained. Each face image can be represented as a two-dimensional image having an N by N array of intensity values (8-bit). When employed to produce eigenvectors, the face image can alternatively be represented as a vector (or point) in a multi-dimensional image space of dimension $N^2$. Thus, the image matrix $$\begin{pmatrix} a_{11}, a_{12}, a_{13}, \ldots, a_{1N} \\ a_{21}, a_{22}, a_{23}, \ldots, a_{2N} \\ \ldots \\ a_{N1}, a_{N2}, a_{N3}, \ldots, a_{NN} \end{pmatrix},$$

where $a_{ij}$ is the intensity of the image at pixel location ij, is mapped to the image vector $(a_{11} \ a_{21} \ \ldots \ a_{N1} \ a_{12} \ a_{22} \ \ldots \ a_{NN})$ A series of acquired images can thus be mapped to a series of points within this rather vast image space.

The creation of eigenfaces turns on the realization that different facial images are nonetheless similar in overall configuration, and are not randomly distributed in the foregoing image space. The images are thus located within a rather small region of this vast image space, or in a relatively low dimensional subspace. Using principal component analysis, one can identify the vectors which best account for the distribution of face images within the entire image space. These vectors, coined "eigenfaces", define the overall "face space" of this system. As previously set forth, each vector having a length $N^2$ describes an N by N image, and can be represented by a linear combination or concatenation of vector values of the original face images that constitute the training set of images.

As mentioned above, principal component analysis (PCA) may be used to reduce the dimensionality, $N^2$ (=65,536 in the example of a 256 by 256 pixel image), of the problem to a more manageable dimension M. The PCA establishes a set of M orthonormal vectors, $u_k$, which best describe the distribution of face data within the face space. The kth vector, $u_k$, is chosen such that $$\lambda_k = (K)^{-1}\Sigma_n(u_k^T\Phi_n)^2$$

is a maximum, subject to:

$$u_k^T u_m = \delta_{km}$$
$$= \begin{cases} 0 & \text{if } k = m \\ 1 & \text{if } k \neq m \end{cases}$$

The vectors $u_k$ and scalars $\lambda_k$ are the eigenvectors and eigenvalues, respectively, of the covariance matrix $$C = (K)^{-1}\Sigma_n \Phi_n \Phi_n^T$$
$$= AA^T$$

where the matrix A is defined by $A=[\Phi_1, \Phi_2, \ldots, \Phi_K]/\sqrt{K}$. The covariance matrix C is an $N^2 \times N^2$ matrix, and determining the $N^2$ eigenvectors and eigenvalues can become an intractable task for typical image sizes.

If $K<N^2$, then it is possible to reduce the amount of computational work because there are at most K "meaningful" eigenvectors, where a meaningful eigenvector is one that is not associated with a zero eigenvalue. The difference between K and the degeneracy of the zero eigenvalue is equal to M. If $A^T A v=0$ has only the trivial solution, then there are K meaningful eigenvectors, otherwise there are fewer than K meaningful eigenvectors. The $N^2$ dimensional eigenvectors may be obtained by first solving for the eigenvectors of the matrix $A^T A$. This last matrix, which is of dimension K×K, can be much smaller than the 65,536 by 65,536 covariance matrix (corresponding to a 256 by 256 image), and thus more manageable;

To wit, consider the eigenvectors $v_i$ of $A^T A$ satisfying:

$$A^T A v_i = \mu_i v_i$$

Pre-multiplying both sides by A, yields:

$$AA^T A v_i = \mu_i A v_i.$$

Therefore, provided $Av_i \neq 0$, which is generically true, or provided $\mu_i \neq 0$, if $v_i$ is an eigenvector of $A^T A$ and $\mu_i$ is the associated eigenvalue, then $Av_i$ is an eigenvector of $C=AA^T$ and $\mu_i$ is the associated eigenvalue. Note that if $Av_i=0$, then $\mu_i=0$.

Likewise, consider the eigenvectors $u_i$ of $AA^T$ satisfying:

$$AA^T u_i = \lambda_i u_i$$

Pre-multiplying both sides by $A^T$, yields:

$$A^T AA^T u_i = \lambda_i A^T u_i.$$

Therefore, provided $A^T u_i \neq 0$, or provided $\lambda_i \neq 0$, if $u_i$ is an eigenvector of $AA^T$ and $\lambda_i$ is the associated eigenvalue, then $A^T u_i$ is an eigenvector of $A^T A$ and $\lambda_i$ is the associated eigenvalue. Note that if $A^T u_i=0$, then $\lambda_i=0$.

Accordingly, the reduction stage 34 constructs the K by K matrix $L=A^T A$, and finds the K eigenvectors, $v_i$, of L. These vectors determine linear combinations of the K training set face images to form the M meaningful eigenfaces $u_k$:

$$u_k = \frac{1}{\sqrt{K}} \sum_{j=1}^{K} v_{jk} \Phi_j$$

where $v_{jk}$ is the jth component of the kth eigenvector.

The foregoing analysis greatly reduces the calculations necessary to handle the image data, from the order of the number of pixels in the image ($N^2$) to the order of the number of images in the training set (K). In practice, the training set of face images can be relatively small ($K<<N^2$), although larger sets are also useful, and the calculations become quite manageable. The associated eigenvalues provide a basis for ranking or ordering the eigenvectors according to their usefulness in characterizing the variation among the images.

In practice, a smaller number M' of most significant eigenvectors chosen from the M significant eigenvectors, is sufficient for identification purposes, since complete and accurate reconstruction of the image is generally unnecessary to create a match. Framed as such, identification becomes essentially a pattern recognition task. Specifically, the eigenfaces span a second vector space of dimension M' that is a subspace of the first vector space of dimension $N^2$. The M' most significant eigenvectors of the L matrix are selected as those with the largest associated eigenvalues, and therefore contain the most useful image information, e.g., contain maximum variance information.

A newly acquired face is represented by a weighted series of eigenvectors formed from the most significant eigenvectors of the image sub-space. It is important to note that this recognition technique assumes that the image, which is not part of the original training set of images, is sufficiently "similar" to those in the training set to enable it to be well represented by the eigenfaces. Hence, a new face image (Γ) is transformed into its eigenface components (i.e., projected into the face space) by a simple operation, namely, $$\Omega_k = u_k^T (\Gamma - \Psi) \qquad \text{(Eq. 21)}$$

for k=1, ..., M'. This describes a set of point-by-point image multiplications and summations, operations which can be performed at approximately frame rate on current image processing hardware.

The weights form a vector $\Omega^T = [\Omega_1 \; \Omega_2 \; \ldots \; \Omega_{M'}]$ that describes the contribution of each eigenface in representing the input face image, treating the eigenfaces as a basis set for face images.

With reference to FIGS. 1 and 6, the Eigen head template stage 164 can include a database of the eigenfaces created by the foregoing Eigen approach. This information can be received by the compression stage 37 or by the discrimination stage 38. The compression stage 37 preferably communicates with the database of eigenfaces stored in the eigenhead template stage 164. The eye information 122 outputted by the first eye find stage 120 is projected by the compression stage 37 into eigenspace and a new set of coefficients is generated that correspond to a weighted sum of the eigen templates stored in the stage 164.

The discrimination stage 38 compares the coefficients corresponding to the new image with a pre-stored coefficient value, or threshold, to determine if a match occurs. Specifically, the foregoing vector Ω is used in a standard pattern recognition algorithm to find which of a number of pre-defined facial feature classes, if any, best describes the newly acquired image. The simplest method for determining which face class provides the best description of an input face image is to find the face class k that minimizes the Euclidean distance $$\epsilon_k = \|(\Omega - \Omega_k)\|^2,$$

where $\Omega_k$ is a vector describing the kth face class. The face classes $\Omega_i$ are calculated by averaging the results of the eigenface representation over a small number of face images (as few as one) of each individual. A face is classified as belonging to class k when the minimum $\epsilon_k$ is below some chosen threshold $\theta_\epsilon$. Otherwise the face is classified as "unknown," and optionally used to create a new face class or the system can deny the person access to the secured facility.

The Euclidean distance is thus employed to compare two facial image representations to determine an appropriate match, e.g., whether the face belongs to a selected face class of pre-stored images. Thus the recognition of the newly acquired face can be verified by performing a simple threshold analysis, that is, if the Euclidean distance is below some pre-determined threshold then there is a match, and the person, for example, can gain access to a secured facility.

Because creating the foregoing vector $\Omega^T$ of weights is equivalent to projecting the original face image onto the low-dimensional face space, many images project onto a given pattern vector. This is generally acceptable since the Euclidean distance $\epsilon$ between the image and the face space is simply the squared distance between the mean-adjusted input image, $\Phi=\Gamma-\Psi$, and its projection onto face space, $$\Phi_f = \sum_{k=1}^{M'} \Omega_k u_k :$$

$$\epsilon^2 = \|(\Phi-\Phi_f)\|^2.$$

Thus, there are four possibilities for an input image and its pattern vector: (1) near face space and near a face class; (2) near face space but not near a known face class; (3) distant from face space and near a face class; and (4) distant from face space and not near a known face class.

In the first case, an individual is recognized and identified. In the second case, an unknown individual is present. The last two cases indicate that the image is not a face image. Case three typically shows up as a false positive in most other recognition systems. In the described embodiment, however, the false recognition may be detected because of the significant distance between the image and the subspace of expected face images.

To summarize, the eigenfaces approach to face recognition involves the steps of (1) collecting a set of characteristic face images of known individuals; (2) calculating the matrix L, (3) finding the corresponding eigenvectors and eigenvalues, (4) selecting the M' eigenvectors with the highest associated eigenvalues; (5) combining the normalized training set of images according to Eq. 7 to produce the reduced set of eigenfaces $u_k$; (6) for each known individual, calculate the class vector $\Omega_k$ by averaging the eigenface pattern vectors $\Omega$ calculated from the original images of the individual; (7) selecting a threshold $\theta_\epsilon$ which defines the maximum allowable distance from any face class; and (8) thresholding $\theta_1$ which defines the maximum allowable distance from face space.

For each new face to be identified, calculate its pattern vector $\Phi$, the distances $\epsilon_i$ to each known class, and the distance $\epsilon$ to face space. If the distance $\epsilon > \theta_1$, classify the input image as not a face. If the minimum distance $\epsilon_k \leq \theta_\epsilon$ and the distance $\epsilon \leq \theta_1$, classify the input face as the individual associated with class vector $\Omega_k$. If the minimum distance $\epsilon_k > \theta_\epsilon$ and $\epsilon \leq \theta_1$, then the image may be classified as "unknown", and optionally used to begin a new face class.

In addition to, or instead of using a k×n image matrix, which represents the intensity of the image as a function of pixel location, an albedo matrix can be utilized. The albedo is a measure of the amount of light reflected by an object, or radiance, relative to the amount of incident light shone on the object, or irradiance, and is indicative of the reflectance or intrinsic brightness of an object. The albedo, for example, can be defined as the ratio of the reflected power to the incident power. Because the albedo is substantially independent of the external lighting on the object, it is a useful quantity to utilize for recognition.

Figure 12:
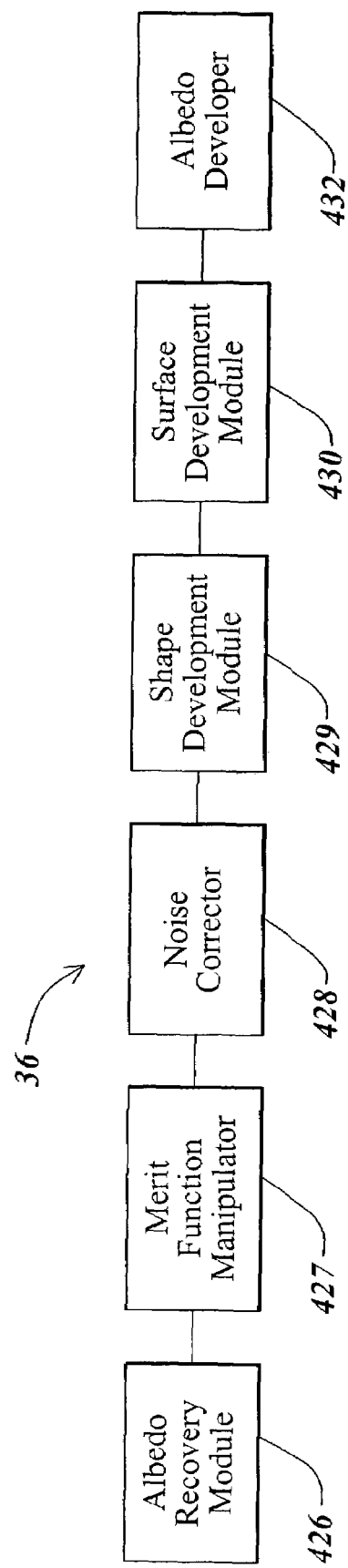
FIG. 12 is a schematic block diagram of the object development unit of the real time facial recognition system of FIG. 1, according to the teachings of the present invention.

FIG. 12 is a schematic block diagram of the object development unit 36 of the real time facial recognition system of FIG. 1 in accordance with the teachings of the present invention. The object development unit 36 includes an albedo recovery module 426, a merit function manipulator 427, a noise corrector 428, a shape development module 429, a surface development module 430, and an albedo developer 432.

The albedo recovery module 426 recovers an albedo from one or more images of an object under varying illuminations. In particular, the albedo recovery module 426 calculates a first albedo of an object using an image of an object that has been exposed to dispersed light and to direct light. Distinguishing between dispersed light and direct light allows for more accurate albedo calculations under various environments. For example, outdoor light can include disperse, or continuous, light whose source is a cloudy sky, and also direct light from a single source such as the sun or a street light. The present invention is capable of accounting for these two types of illumination when calculating an albedo, as described in more detail below. To this end, the merit function manipulator 427 utilizes the first albedo to calculate a first parameter indicative of the dispersed light and a second parameter indicative of the direct light. The noise corrector 428 measures and corrects for shadow and glare in the image. The noise corrector 428 identifies areas with illumination discontinuities. These areas are omitted from the calculations that account for disperse and direct light. The albedo developer 432 obtains a second albedo by using the first parameter, and the second parameter. Using this second albedo, or a representation thereof, the discrimination stage 38 identifies the object.

The shape development module 429 and the surface development module 430 provide data to the albedo developer 432 for the calculation of the second albedo. In particular, the shape development module 429 provides a technique for determining and storing an illumination invariant representation of the object, such as a human face. The shape development module 429 uses principal component analysis to obtain an approximate shape of the object. The surface development module 430 obtains normals to the surface of the object being identified from the approximate shape, which normals may be used to standardize the illumination direction in images of human faces acquired with arbitrary illumination.

Figure 13:
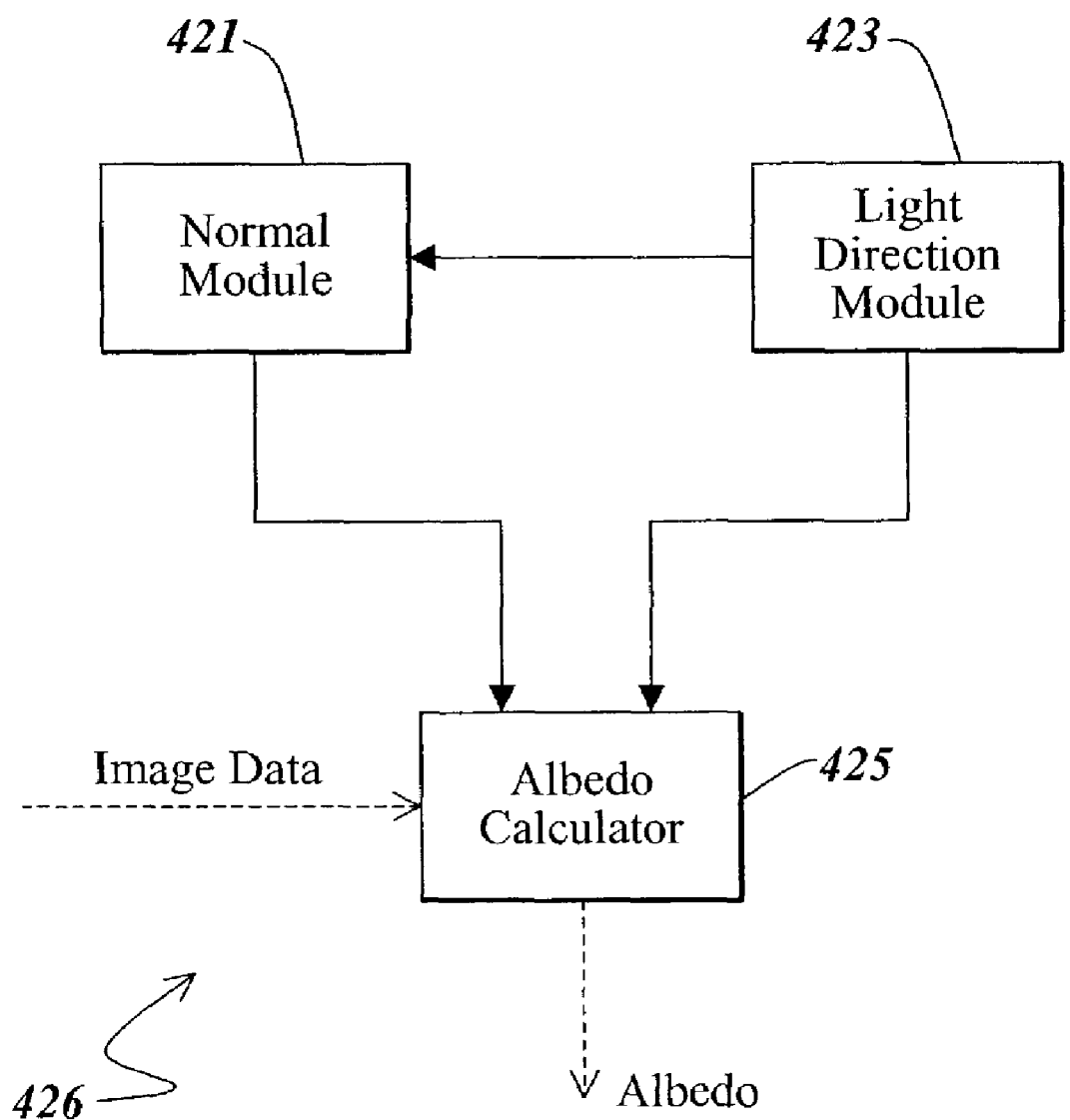
FIG. 13 shows components of the albedo recovery module of FIG. 12, according to the teachings of the present invention.

Referring to FIG. 13, components of the albedo recovery module 426 are shown. The albedo recovery module 426 includes a light direction module 421, a normal module 423, and an albedo calculator 425. The light direction module 421 determines a direction of the light source of the object, such as a face, which is to be identified. The normal module 423 obtains the normals to the object at several locations of the object, which, in one embodiment, are subsequently used by the light direction module 421 to determine light direction. The albedo calculator 425 can determine the first albedo from the direction of the light source, the normals, and the image matrix or data.

Assuming the object being examined has a Lambertian surface (i.e., the surface is rough relative to the incident wavelength so that the energy being reflected is substantially equal in all directions), which is a good assumption for human skin, then $$\text{Image} = A * \max(Bs, 0) \quad \text{(Eq. 22)}$$

where "Image" is the k×n image matrix, A is the k×n albedo matrix, B is the kn×3 matrix of normalized normal vectors to the surface of the object given by $$B = \begin{pmatrix} n_{11} & n_{12} & n_{13} \\ n_{21} & n_{22} & n_{23} \\ \cdots \\ n_{k1} & n_{k2} & n_{k3} \end{pmatrix}$$

with the jth row given by the three normal coordinates at the position of the pixel corresponding to the jth row of the image vector, and $s=(s_1, s_2, S_3)$ corresponds to the direction of the light source. The "max" indicates that any negative component of Bs should be replaced by zero. In (Eq. 22), the kn×1 vector Bs is replaced by its corresponding k×n matrix before multiplying with the k×n albedo matrix A. Moreover, the asterisk denotes "point-by-point" multiplication. Thus, the ijth component of the image vector is given by $A_{ij}(n_{ij}^1 s_1 + n_{ij}^2 s_2 + n_{ij}^3 s_3)$.

The albedo calculator 425 calculates the first albedo using Eq. 22. The shape of the surface of the object may be used to calculate the normals with the aid of the surface development module 430. The light direction module 421 can obtain the direction of the light source of the object. To improve accuracy, the albedo may be calculated under various illumination conditions. A least-square analysis may then be performed to find a more accurate albedo.

To calculate the first albedo using Eq. 22, the light direction module 421 determines the direction of the light source s. In one embodiment, where the object of interest is a human face, a mean human face surface can be pre-calculated and used to calculate s according to which is obtained from Eq. 22 after the "max" restriction is relaxed. Values for matrix B $$s \approx inv(B^T B) B^T \text{Image} \qquad \text{(Eq. 26)}$$

are provided by the normal module 423 and are taken from the mean human face surface.

One approximation of an albedo from an image at each point of the map is $$\text{albedo} = \sqrt{P^2 + Q^2 + 1},$$

where (P, Q, 1) is proportional to the normal vector $(N_x, N_y, 1)$ at the surface of an object in the image.

With the use of Eq. 22, the albedo calculator 425 can approximate the first albedo as $$\text{Albedo} = \frac{\text{Image}}{B * s} \qquad \text{(Eq. 23)}$$

where B is computed from the mean human face surface. In agreement with the earlier definition, the numerator in the last equation is a measure of the radiance of the image, and the denominator is a measure of the irradiance. Alternatively, B can be obtained using photoclinometry, or shape-from-shading. Photoclinometry is a method for determining the shape of a surface, and the normal coordinates from its image, as described by B. Horn in "Slope and Height from Shading" the contents of which are herein incorporated by reference.

The first albedo can be better approximated through a sequence of iterations where on each step of the iteration a new light direction is approximated using the new albedo. At each step of the iterative procedure, the image of an object may be obtained from input images, Image1, Image2, .... The image radiance, Bs, can be found from $(-P, -Q, 1)*(S_1, S_2, S_3)$, where $(S_1, S_2, S_3)$ is the direction of an illumination source, as described above. The albedo can be approximated using Eq. 23 at each pixel of the image.

In one embodiment, the albedo may be smoothed and calibrated before performing the next iteration. Smoothing the albedo involves finding a mean albedo according to $$\text{SmoothAlbedo} = \text{Albedo} * \begin{pmatrix} 1 & 1 & 1 \\ 1 & 1 & 1 \\ 1 & 1 & 1 \end{pmatrix} * \frac{1}{9}$$

The resultant smoothed albedo may then be calibrated according to $$\text{Albedo} = k(\text{Albedo}) + (1-k)(\text{Smoothalbedo})$$

where k is an experimentally adjusted coefficient (for example, k=0.7). Those of ordinary skill will readily recognize that other coefficients can be used. The smoothing and calibration involves a matrix addition between the matrix albedo and mean albedo. The mean albedo matrix, having the same size as the albedo matrix, has matrix elements obtained by averaging nine matrix elements: the particular matrix element of the albedo matrix and its eight surrounding elements. After each iteration, a check is performed to determine if the albedo has converged. If the albedo has not converged, another iteration is performed. This process can be repeated until convergence occurs.

Instead of utilizing a generic mean human face surface obtained by the albedo recovery module 426 to compute the normals, as described above, a shape development module 429 may be used to compute the normals by employing the image of the object and principle component analysis (PCA).

In particular, when the object to be identified is a face, a training database having J face albedo vectors $\{Ar_1, \ldots, Ar_J\}$, and J corresponding shape vectors $\{Sr_1, \ldots, Sr_J\}$ is first obtained by the shape development module 429. A shape vector of an object, $(s_{11}\ s_{21}\ \ldots\ s_{N1}\ s_{12}\ s_{22}\ \ldots\ s_{NN})$, is obtained from its corresponding shape matrix, $$\begin{pmatrix} s_{11}, s_{12}, s_{13}, \ldots, s_{1N} \\ s_{21}, s_{22}, s_{23}, \ldots, s_{2N} \\ \cdots \\ s_{N1}, s_{N2}, s_{N3}, \ldots, s_{NN} \end{pmatrix},$$

where $s_{ij}$ is the height of the object at pixel location ij. PCA may be used by the shape development module 429, as detailed above, to compute meaningful eigenvectors, $A_1, \ldots, A_K$, with eigenvalues $\lambda a_1, \ldots, \lambda a_K$, from the albedo vectors, and $S_1, \ldots, S_K$, with eigenvalues $\lambda s_1, \ldots, \lambda s_K$, from the shape vectors, where, for simplicity, it is assumed that the number of significant albedo and shape eigenvectors is K.

The albedo and shape vectors may then be expanded in terms of the eigenvectors:

$$Sr_1 = k_1^1 \frac{S_1}{\lambda s_1} + k_2^1 \frac{S_2}{\lambda s_2} + \ldots + k_K^1 \frac{S_K}{\lambda s_N},$$

$$Sr_2 = k_1^2 \frac{S_1}{\lambda_1} + k_2^2 \frac{S_2}{\lambda_2} + \ldots + k_K^2 \frac{S_k}{\lambda s_K},$$

$$\ldots$$

$$Sr_K = k_1^K \frac{S_1}{\lambda s_1} + k_2^K \frac{S_2}{\lambda s_2} + \ldots + k_K^K \frac{S_K}{\lambda s_K},$$

where $k_i^j$ is a coefficient of the shape representation in the shape eigenspace. Similarly, the albedo training vectors can be expanded in terms of the albedo eigenvectors:

$$Ar_1 = a_1^1 \frac{A_1}{\lambda s_1} + a_2^1 \frac{A_2}{\lambda s_2} + \ldots + a_N^1 \frac{A_K}{\lambda s_K},$$

$$Ar_2 = a_1^2 \frac{A_1}{\lambda s_1} + a_2^2 \frac{A_2}{\lambda s_2} + \ldots + a_N^2 \frac{A_k}{\lambda s_K},$$

$$\ldots$$

$$Ar_K = a_1^K \frac{A_1}{\lambda s_1} + a_2^K \frac{A_2}{\lambda s_2} + \ldots + a_K^K \frac{A_K}{\lambda s_K},$$

where $\alpha_i^j$ is a coefficient of the albedo representation in the albedo eigenspace.

The coefficients of the representations can be written down in two matrices:

$$Srep = \begin{pmatrix} k_1^1, k_2^1 \ldots k_K^1 \\ k_1^2, k_2^2 \ldots k_K^2 \\ \ldots \\ k_1^K, k_2^K, k_K^K \end{pmatrix}, Arep = \begin{pmatrix} a_1^1, a_2^1 \ldots a_K^1 \\ a_1^2, a_2^2 \ldots a_K^2 \\ \ldots \\ a_1^K, a_2^K, a_K^K \end{pmatrix}$$

A correlation matrix between albedo and shape may then be found as

CorrelationMatrix=Cor=SrepArep.

The correlation matrix indicates the correlation between changes that occur in the albedo space and changes that occur in the shape space. If an approximate albedo, AlbedoAppx, has been found for a given image, then the corresponding approximate shape can be found as $$AppxShape = MeanShape + (\lambda s_1 S_1, \lambda s_2 S_2, \ldots, \lambda s_K S_K) Cor \times \quad \text{(Eq. 24)}$$

$$\left( \frac{A_1}{\lambda a_1}, \frac{A_2}{\lambda a_2}, \ldots, \frac{A_K}{\lambda a_K} \right)(AlbedoAppx - MeanAlbedo)$$

With this approximate shape, the surface development module 430 can obtain normals to the surface of the object being identified, and subsequently a new albedo can be computed as described above. Several such iterations may be performed to improve the calculated first albedo of the object.

The methods described above allow a computation of the first albedo. Methods of computing a more refined albedo, which takes into account disperse and direct illumination, will now be presented.

Disperse or continuous illumination conditions can be described by the albedo of an object, since the albedo by definition assumes uniform Lambertian illumination from all angles. To account additionally for direct light, from the sun for example, a linear combination of the two types of illumination can be employed:

$$\text{Image} = A[\alpha + \beta^* \max(B^* s, 0)] \quad \text{(Eq. 25)}$$

The first parameter, $\alpha$, reflects the contribution to the image from the direct light, and the second parameter, $\beta$, reflects the contribution from the disperse light.

To determine the values of the first and second parameters, a least squares analysis can be performed to minimize a merit function, $\chi$, given by $$\chi^2 = \Sigma \{\text{Image} - A[\alpha + \beta^* \max(B^* s, 0)]\}^2 \quad \text{(Eq. 26),}$$

where the sum is over all areas of the image that have not been identified by the noise corrector 428 as having discontinuities arising from such factors as shadows or glare (please check). In (Eq. 26), A is the first albedo and B and s are as defined above. The first and second parameters weight the two illumination conditions, disperse or direct, appropriately. The merit function manipulator 427 can use a linear least squares analysis, known to those of ordinary skill in the art, to find the first parameter and the second parameter that minimize the merit function, $\chi$.

Having identified the values of the first and second parameters, a second albedo can be calculated by the albedo developer 432. In particular, the albido developer 432 can use Eq. 25 to solve for A, the second albedo. To the extent that the two types of illumination are taken into account in the calculation, the direct and disperse light sources, characterized by the first and second parameters respectively, the second albedo is a more accurate estimate than the first albedo.

To calculate the second albedo via Eq. 25, the albedo developer 432 inputs the illumination direction of the image, as determined by the light direction module 421. In addition, to calculate the second albedo the albedo developer 432 inputs the shape of the image from which may be obtained the normals of the object captured in the image.

The shape of the image input by the albedo developer 432 can be a mean shape of the object, or can be calculated from the correlation matrix, as outlined above. In particular, the shape of the object of the image can be calculated from Eq. 24.

After the calculation of the second albedo by the albedo developer 432, the discrimination stage 38 can attempt to match the second albedo to a database of reference albedos. This can be done by calculating the norm of the difference between the second albedo vector and reference albedo vectors. In another embodiment, instead of using the second albedo directly to find a match, a PCA analysis may be performed before attempting a match with a representation of the second albedo.

In particular, using a training set of albedos, a covariance matrix can be formed, in an analogy to the discussion surrounding the equation $C = (K)^{-1} \Sigma_n \Phi_n \Phi_n^T$ above. The compression stage 37 can compute the projection of $A - \overline{A}$, where A is the albedo vector corresponding the image and $\overline{A}$ is the average albedo over the training set, onto the subspace spanned by the eigenvectors of the albedo covariance matrix. The projection of $A - \overline{A}$ can then be input into the discrimination stage 38. The discrimination stage 38 can then attempt to match the projection to reference projections from a database.

The shape development module 429 and the surface development module 430 can be used at several stages to refine an albedo. In particular, modules 429 and 430 can be used before or after the merit function manipulator 428 finds the first and second parameters indicative of direct and disperse light. The modules 429, 430 can be used before the computation of these parameters to improve the first albedo. Thus, after the albedo recovery module 426 computes the first albedo using Eq. 23, this first albedo can be used by the shape development module 429 and the surface development module 430 to calculate an improved shape of the object using Eq. 24. In turn, the improved shape can be used to calculate an improved albedo. More iterations can occur as desired.

Alternatively, the shape development module 429, and the surface development module 430 can be used after the merit function manipulator 427 computes the first and second parameters. Thus, a first albedo can be computed using Eq. 23. Next, the shape development module 429, and the surface development module 430 can use this albedo and Eq. 24 to compute an improved approximation of the shape of the object. This improved shape and Eq. 25 may then be used by the albedo developer 432 to compute an improved albedo. Further iterations can be performed as desired.

Figure 14:
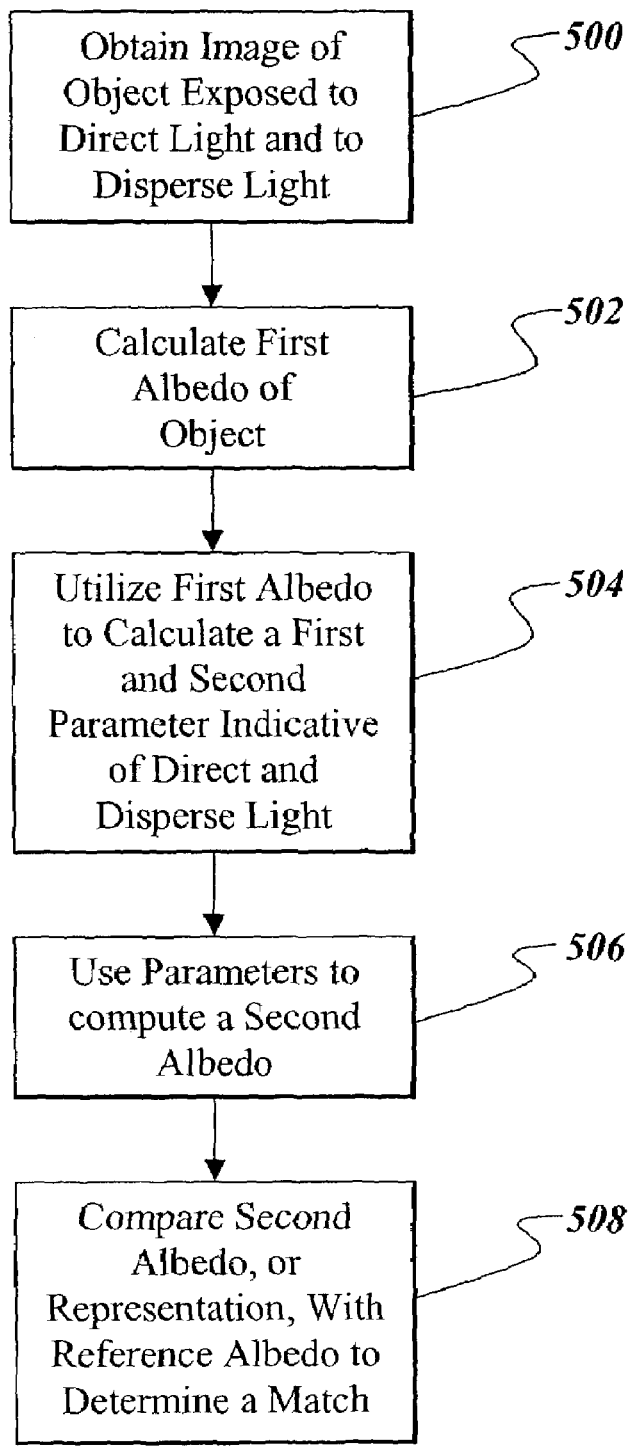
FIG. 14 shows a flowchart for identifying an object, according to the teachings of the present invention.

Referring to FIG. 14, a flowchart for identifying an object is presented. In step 500, the image acquisition device 22 acquires an image of an object exposed to direct light and to disperse light. In step 502, the albedo recovery module 426 obtains a first albedo from the image of the object. In step 504, the merit function manipulator 427 utilizes the first albedo to calculate a first parameter indicative of the direct light and a second parameter indicative of the disperse light. In step 506, the albedo developer 432 obtains a second albedo by using the first parameter, and the second parameter. Subsequently, in step 508, the discrimination stage 38 utilizes the second albedo, or a representation thereof, to identify the object.

Figure 15:
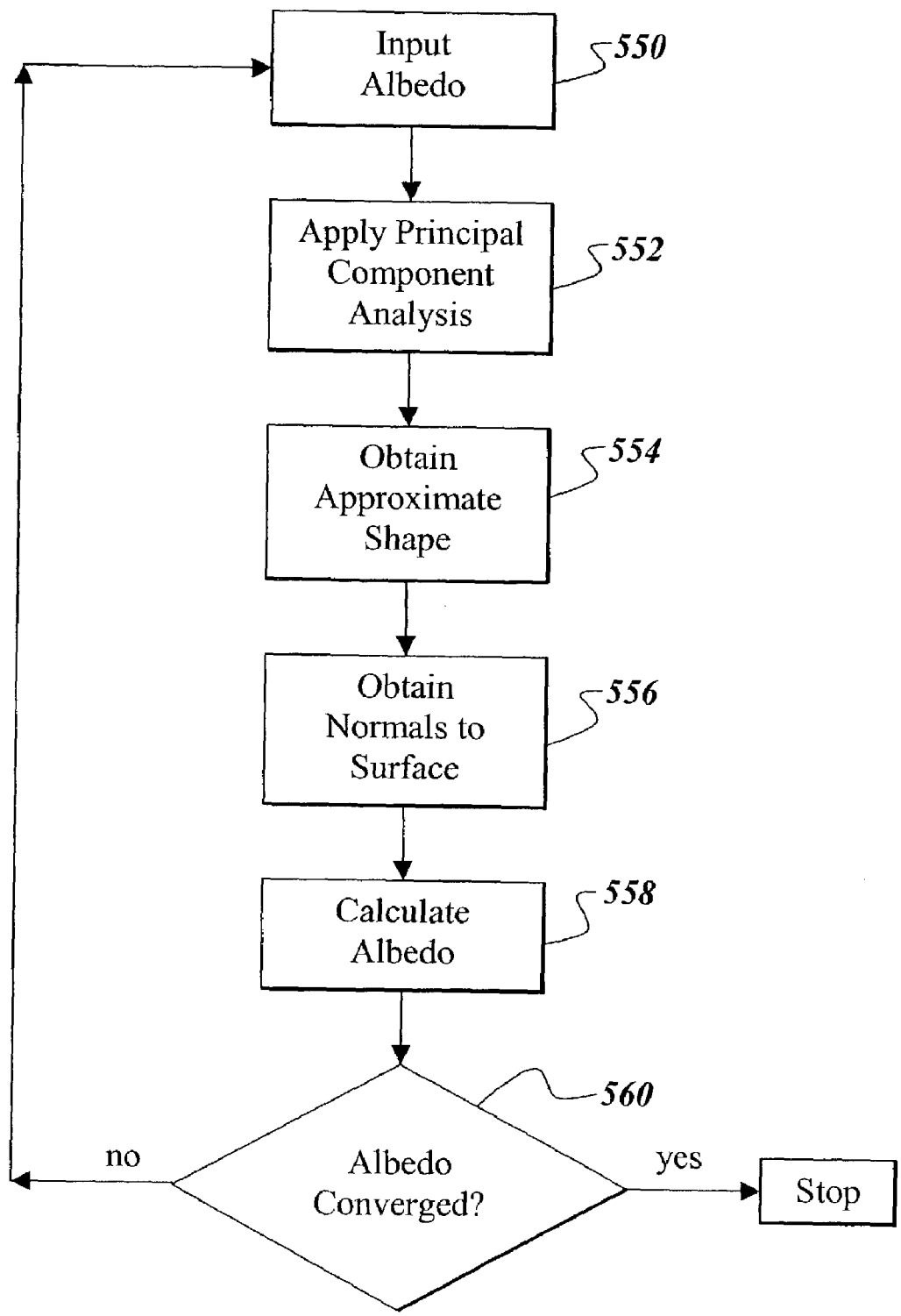
FIG. 15 shows a flowchart for refining an albedo utilizing principal component analysis, according to the teachings of the present invention.

FIG. 15 shows a flowchart for a method to improve an albedo. The method employs an input albedo to compute a shape of the image via Eq. 24. This input albedo can be calculated by the albedo recovery module 426 prior to the computation of the first and second parameters in step 504, or can be calculated by the albedo developer 432 with the use of the first and second parameters computed in step 504. In step 550, an input albedo calculated by the albedo recovery module 426 or the albedo developer 432 is input into the shape development module 429. In step 552, principal component analysis is applied by the shape development module 429. In step 554, the shape development module 429 calculates an approximate shape of the object. In step 556, the surface development module 430 calculates the normals from the approximate shape output from the shape development module 425. In step 558, the albedo recovery module 426 can use the normals and Eq. 23, or the albedo developer 432 can use the normals and Eq. 25 to calculate an improved albedo. In step, 560, if the albedo has converged sufficiently, the flow can stop; otherwise, the flow can be transferred back to step 550 to iterate.

Figure 16:
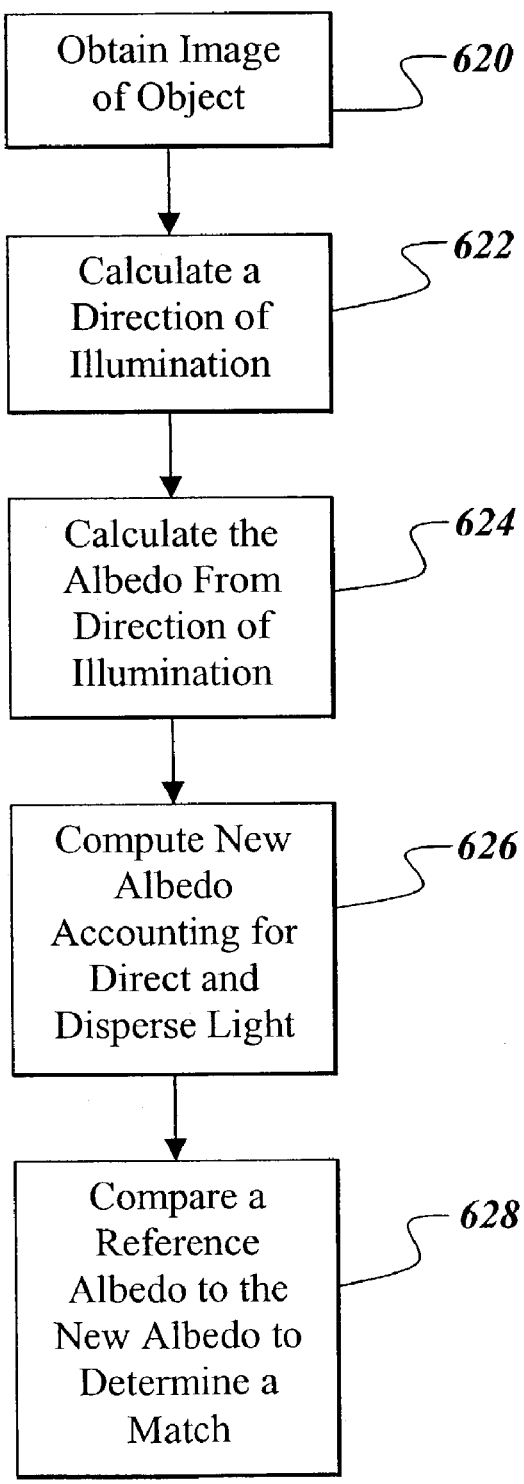
FIG. 16 shows a flowchart for identifying an object by calculating a direction of illumination and accounting for direct and disperse lighting, according to the teachings of the present invention.

Referring to FIG. 16, a flowchart for a method for identifying an object is presented that calculates a direction of illumination to compare an albedo of the object with a reference albedo. In step 620, an image of the object is received or obtained. Next, in step 622, the albedo recovery module 426 calculates a direction of illumination of the image. According to the above analysis, the direction of illumination is substantially given by $$s \approx inv(B^T B) B^T I$$

where B is a matrix of the normals and I represents the image. In step 624, the albedo recovery module 426 calculates the albedo of the object by utilizing the direction of illumination. The albedo can be further processed, if desired, with the help of the shape development module 429 and the surface development module 430. In step 626, the albedo can be used to calculate a new albedo that accounts for the presence of direct and disperse illumination of the object. In particular, the albedo can be used, together with Eq. 25, to calculate a new albedo. In step 628, a reference albedo is compared to the new albedo of the object to determine a match between the object and the reference object for identifying the object. Alternatively, the new albedo is subjected to PCA analysis in which a representation of the albedo, the projection of A–$\underline{A}$ for example, is compared to vectors in a reference database.

The foregoing methods and system use an albedo of an object to acquire, compare and recognize of an object, such as a face, in real-time, with minimal, if any, intrusion on the person. The system is computationally efficient and therefore avoids the time and processor intensive applications performed by prior art facial recognition systems. Moreover, the accuracy of the object recognition is significantly improved because the computation of the albedo takes into account the types of light that can illuminate the object.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A method for identifying an object, the method comprising
    acquiring an image of an object exposed to direct light and to disperse light;
    calculating a first parameter indicative of the direct light and a second parameter indicative of the disperse light;
    obtaining an albedo by using the first parameter, and the second parameter; and
    utilizing the albedo to identify the object.

2. The method of claim 1, wherein the step of calculating comprises the steps of, obtaining a first albedo from the image of the object; and
    utilizing the first albedo to calculate the first parameter and the second parameter.

3. The method of claim 2, wherein the step of obtaining a first albedo comprises,
    calculating a first amount of light that irradiates the object; and
    calculating a second amount of light that radiates from the object.

4. The method of claim 3, wherein the step of calculating a first amount of light that irradiates the object comprises,
obtaining a mean shape of the object;
calculating a normal at one or more locations on the mean shape of the object; and
obtaining a direction of illumination of the object, wherein the first amount of light is calculated using at least the normal and the direction of illumination.

5. The method of claim 4, further comprising the steps of:
representing the first albedo as an albedo matrix; and
smoothing the albedo matrix by averaging matrix elements of the albedo matrix.

6. The method of claim 5, further comprising the step of calibrating the smoothed albedo matrix.

7. The method of claim 6, wherein the calibrated albedo matrix is substantially equal to kA+(1−k)S, where A is the albedo matrix, S is the smoothed albedo matrix, and k is a coefficient that is substantially equal to about 0.7.

8. The method of claim 4, wherein the step of utilizing the first albedo comprises minimizing a merit function of the first parameter and the second parameter.

9. The method of claim 8, wherein the merit function is given by $\|\Gamma-(\alpha C+\beta D)\|$, where $\Gamma$ is a vector that represents the image, C is a vector that represents the first albedo, D is a vector that depends on the mean shape and the direction of illumination, $\alpha$ denotes the first parameter, and $\beta$ denotes the second parameter.

10. The method of claim 3, wherein the step of calculating a first amount of light that irradiates the object comprises,
calculating a normal at one or more locations on the object; and
obtaining a direction of illumination of the object, wherein the normal and the direction of illumination are utilized to calculate the first amount of light.

11. The method of claim 10, wherein, in the step of calculating a normal, each said normal is determined from shading of the image utilizing a photoclinometry process.

12. The method of claim 10, further comprising the steps of
representing the first albedo as an albedo matrix; and
smoothing the albedo matrix by averaging matrix elements of the albedo matrix.

13. The method of claim 12, further comprising the step of calibrating the smoothed albedo matrix.

14. The method of claim 13, wherein the calibrated albedo matrix is substantially equal to kA+(1−k)S, where A is the albedo matrix, S is the smoothed albedo matrix, and k is a coefficient that is substantially equal to about 0.7.

15. The method of claim 3, wherein the second amount of light that radiates from the object is obtained from the image of the object.

16. The method of claim 2, wherein the step of utilizing the albedo comprises
associating a vector with the albedo;
calculating eigenvectors of a correlation matrix from a training set of albedos, the eigenvectors spanning a subspace;
projecting the vector onto the subspace to obtain an albedo representation of the object; and
comparing the albedo representation of the object to reference representations to find a match, thereby identifying the object.

17. A system for identifying an object, the system comprising
an image acquisition device for acquiring an image of an object exposed to direct light and to disperse light;
a merit function manipulator for calculating a first parameter indicative of the direct light and a second parameter indicative of the disperse light;
an albedo developer for obtaining an albedo associated with the image by using the first parameter, and the second parameter; and
a discrimination stage for utilizing the albedo to identify the object.

18. The system of claim 17, further comprising an albedo recovery module for obtaining a first albedo from the image of the object, wherein the merit function manipulator utilizes the first albedo to calculate the first parameter and the second parameter.

19. The system of claim 18, wherein the albedo recovery module calculates a first amount of light that irradiates the object, and a second amount of light that radiates from the object.

20. The system of claim 19, wherein the albedo recovery module includes
a normal module for calculating a normal at one or more locations on a mean shape of the object; and
a light direction module for obtaining a direction of illumination of the object, wherein the first amount of light is calculated using at least the normal and the direction of illumination.

21. The system of claim 20, wherein the albedo recovery module represents the first albedo as an albedo matrix, and smoothes the albedo matrix by averaging matrix elements of the albedo matrix.

22. The system of claim 21, wherein the albedo recovery module calibrates the smoothed albedo matrix.

23. The system of claim 22, wherein the calibrated albedo matrix is substantially equal to kA+(1−k)S, where A is the albedo matrix, S is the smoothed albedo matrix, and k is a coefficient that is substantially equal to about 0.7.

24. The system of claim 19, wherein the second amount of light that radiates from the object is obtained from the image of the object.

25. The system of claim 18, wherein the albedo recovery module comprises,
a normal module for calculating a normal at one or more locations on the object; and
a light direction module for obtaining a direction of illumination of the object, wherein the normal and the direction of illumination are utilized to calculate the first amount of light.

26. The system of claim 25, wherein the normal module calculates the normal from shading of the image utilizing a photoclinometry process.

27. The system of claim 25, wherein the albedo recovery module represents the first albedo as an albedo matrix, and smoothes the albedo matrix by averaging matrix elements of the albedo matrix.

28. The system of claim 27, wherein the albedo recovery module calibrates the smoothed albedo matrix.

29. The system of claim 28, wherein the calibrated albedo matrix is substantially equal to kA+(1−k)S, where A is the albedo matrix, S is the smoothed albedo matrix, and k is a coefficient that is substantially equal to about 0.7.

30. The system of claim 29, wherein the merit function is given by $\|\Gamma-(\alpha C+\beta D)\|$, where $\Gamma$ is a vector that represents the image, C is a vector that represents the first albedo, D is a vector that depends on the mean shape and the direction of illumination, $\alpha$ denotes the first parameter, and $\beta$ denotes the second parameter.

31. The system of claim 18, wherein the merit function manipulator utilizes the first albedo to minimize a merit function of the first parameter and the second parameter.

32. The system of claim 17, further comprising
an image manipulation stage for associating a vector with the albedo, and for calculating eigenvectors, which span a subspace, of a correlation matrix from a training set of albedos; and
a compression stage for projecting the vector onto the subspace to obtain an albedo representation of the object, wherein the discrimination stage compares the albedo representation of the object to reference representations to find a match, thereby identifying the object.

33. A system for identifying an object in an image, the system comprising
an object development unit for producing a representation of the object using a first parameter indicative of direct light illuminating the image and a second parameter indicative of disperse light illuminating the image; and
a discrimination stage for matching the representation of the object to a second representation of the object held in a storage device to identify the object;
wherein the object development unit comprises an albedo recovery module for producing a first albedo by determining a first amount of light that irradiates the object, and a second amount of light that radiates from the object, the first albedo is used to produce the first parameter and the second parameter.

34. The system of claim 33, wherein a ratio of the second amount of light to the first amount of light determines the first albedo.

35. The system of claim 33, wherein the albedo recovery module determines the first amount of light by utilizing a direction of illumination of the object and by utilizing a normal at one or more locations on the object.

36. The system of claim 35, wherein the normal is calculated from a mean shape of the object.

37. The system of claim 35, wherein the normals are calculated from shading of the image utilizing a photoclinometry process.

38. The system of claim 33, wherein the albedo recovery module represents the first albedo as an albedo matrix, and smooths the albedo matrix by averaging matrix elements of the albedo matrix.

39. The system of claim 38, wherein the albedo recovery module calibrates the smoothed albedo matrix to yield a calibrated albedo matrix given substantially by kA+(1−k)S, where A is the albedo matrix, S is the smoothed albedo matrix, and k is a coefficient that is substantially equal to about 0.7.

40. The system of claim 33, wherein the object development unit comprises an albedo recovery module for determining a first albedo of the object, the first albedo used to calculate the first parameter and the second parameter.

41. The system of claim 40, wherein the object development unit further comprises at least one of
a shape development module for determining at least an approximate shape of the object from the first albedo generated by the albedo recovery module, and
a surface development module for determining at least one normal of the approximate shape of the object determined by the shape development module.

42. The system of claim 40, wherein the albedo recovery module comprises at least one of
a normal module for determining at least one normal from a shape of the object,
a light direction module for determining a direction of light irradiating the object, and
an albedo calculator for calculating the first albedo of the object as a function of at least the light direction and the normal.

43. The system of claim 42, wherein the albedo calculator calculates the first albedo as a function of the light direction, the normal, and image data introduced to the albedo calculator.

44. The system of claim 43, further comprising
a head find stage for finding the head of the object, and
an eye find stage for finding the eyes of the object.

45. In a system capable of acquiring an image of an individual, a method for identifying the individual from an acquired image of the individual, the method comprising the steps of:
acquiring an image of the individual with an image acquisition device;
determining from the acquired image a first parameter and a second parameter;
generating a first representation of the individual in the acquired image;
generating a second representation of the individual in the acquired image using the first parameter, the second parameter and the first representation; and
identifying the individual in the acquired image using the second representation of the individual;
wherein the step of generating a first representation comprises the step of, determining one or more areas in the acquired image of the individual that are disregarded when generating the first representation.

46. The method of claim 45, wherein the step of generating a first representation further comprises the step of, determining a shape of an object in the acquired image.

47. The method of claim 46, further comprising the steps of,
determining from the shape of the object a shape of a surface of the object; and
determining a perpendicular element extending the surface of the object wherein, the perpendicular element indicates a direction of illumination in the acquired image.

48. The method of claim 45, wherein the first representation comprises a first albedo.

49. The method of claim 45, wherein the second representation comprises a second albedo.

50. The method of claim 45, wherein the first parameter represents dispersed light in the acquired image.

51. The method of claim 45, wherein the second parameter represents direct light in the acquired image.

52. A computer readable medium holding device executable instructions for performing a method to identify an individual using an amount of light reflected by the individual, the method comprising the steps of,
capturing an image of the individual with an image capturing device;
generating a first representation of the individual from the captured image using the amount of light reflected by the individual in the captured image;
generating a second representation of the individual from the first representation; and
identifying the individual using the second representation;
wherein the first representation comprises a first albedo of the individual in the captured image.

53. The computer readable medium of claim 52, further comprising the step of, compensating for shadow and glare in the captured image.

54. The computer readable medium of claim 52, further comprising the step of, determining a first parameter and second parameter from the captured image, wherein the first parameter and the second parameter are used in generating the first representation.

55. The computer readable medium of claim 54, wherein the first parameter comprises dispersed light data in the captured image.

56. The computer readable medium of claim 54, wherein the second parameter comprises direct light data in the captured image.

57. The computer readable medium of claim 52, wherein the second representation comprises a second albedo of the individual in the captured image.

* * * * *